US007698167B2

(12) United States Patent
Batham et al.

(10) Patent No.: US 7,698,167 B2
(45) Date of Patent: Apr. 13, 2010

(54) CATALOG BUILDING METHOD AND SYSTEM

(75) Inventors: Prashubh Batham, Savage, MN (US); Stephanie Rief, Apple Valley, MN (US)

(73) Assignee: Computer Pundits, Inc., Bloomington, MN (US)

( * ) Notice: Subject to any disclaimer, the term of this patent is extended or adjusted under 35 U.S.C. 154(b) by 338 days.

(21) Appl. No.: 10/062,614

(22) Filed: Jan. 31, 2002

(65) Prior Publication Data
US 2002/0082953 A1 Jun. 27, 2002

Related U.S. Application Data

(60) Provisional application No. 60/266,076, filed on Jan. 31, 2001.

(51) Int. Cl.
G06Q 30/00 (2006.01)
(52) U.S. Cl. .................................. 705/26; 705/37
(58) Field of Classification Search .................. 705/26, 705/27, 37
See application file for complete search history.

(56) References Cited

U.S. PATENT DOCUMENTS

| 5,649,185 | A | * | 7/1997 | Antognini et al. | 707/9 |
|---|---|---|---|---|---|
| 5,740,425 | A | * | 4/1998 | Povilus | 707/100 |
| 5,890,175 | A | * | 3/1999 | Wong et al. | 715/505 |
| 5,896,462 | A | * | 4/1999 | Stern | 382/306 |
| 5,960,411 | A | * | 9/1999 | Hartman et al. | 705/26 |
| 6,052,670 | A | * | 4/2000 | Johnson | 705/27 |
| 6,112,242 | A | * | 8/2000 | Jois et al. | 709/225 |
| 6,213,780 | B1 | * | 4/2001 | Ho et al. | 434/219 |
| 6,381,607 | B1 | * | 4/2002 | Wu et al. | 707/100 |
| 6,499,042 | B1 | * | 12/2002 | Markus | 715/507 |
| 6,516,337 | B1 | * | 2/2003 | Tripp et al. | 709/202 |
| 6,532,450 | B1 | * | 3/2003 | Brown et al. | 705/40 |
| 6,546,388 | B1 | * | 4/2003 | Edlund et al. | 707/5 |
| 6,721,735 | B1 | * | 4/2004 | Lee | 707/5 |
| 7,277,931 | B1 | * | 10/2007 | Booth et al. | 709/220 |
| 2001/0047304 | A1 | * | 11/2001 | Rinne | 705/26 |
| 2002/0077921 | A1 | * | 6/2002 | Morrison et al. | 705/26 |
| 2003/0115212 | A1 | * | 6/2003 | Hornibrook et al. | 707/103 R |

OTHER PUBLICATIONS

Computer Pundits Releases New Software. EDI News. Potomac: Jun. 26, 1995. p. 1, 1 page.*

(Continued)

*Primary Examiner*—James ZUrita
(74) *Attorney, Agent, or Firm*—Larkin Hoffman Daly & Lindgren Ltd.; Craig J. Lervick

(57) ABSTRACT

Systems and methods are described which produce a catalog from a previously existing database. The method defines catalog data fields and links same to the data fields of the database. In one embodiment, the method scans the database for its dat fields and automatically uses same as the catalog data fields. This improves the efficiency of catalog production because a publisher need not be trained as to what data is in the database. The method further automatically formats the data from the data base into a catalog. In another embodiment, the method automatically produces a table of contents and an index. The present method can produce the catalog in multiple formats, including electronic, portable document format, rich text format, and printed.

36 Claims, 27 Drawing Sheets

OTHER PUBLICATIONS

New Internet Site Provides Free Searchable FAQ Database and E-mail Response Service for Computing Questions Business Editors/High Tech Writers. Business Wire. New York: Dec. 8, 1999. p. 1, 2 pages.*

Computer Pundits Offers Creation, Management and Hosting of Dynamic Database E-Commerce Catalogs, PR Newswire. New York: May 2, 2000. p. 1, 2 pages.*

Computer pundits introduces catalog builder, Anonymous. Link-up. Medford: Mar./Apr. 1999.vol. 16, Iss. 2; p. 27, 1 pgs, 2 pages.*

Screen shots of screen from www.archive.org that show that www.catalogbuilder.com has been active since at least Dec. 12, 1998 and that www.computerpundits.com has been active since at least Jan. 17, 1998. MS/Word document, 2 pages.*

"A lesson in good management Prashubh Batham started Computer Pundits Corp. in 1991—but he didn't get involved full-time until Jan. 1999. He was busy working for other companies, learning what it takes to build a successful business."; [METRO Edition], Dick Youngblood, Staff Writer. Star Tribune. Minneapolis, Minn.: Feb. 27, 2000. p. 03.D, dow.*

* cited by examiner

| Computer Pundits Corporation | | Phone 952-854-2422 Fax 952-942-7474 | |
|---|---|---|---|

Golf Clubs

Group 1 — Calloway

The concentration of mass in the heel, toe and topline areas promotes maximum stability on off-center hits.

Drivers

| ID Code | Product | Price | Description |
|---|---|---|---|
| 4567 | Big Bertha | $250.50 | Great for beginners, league players, and pros alike. |
| 4568 | Big Bertha | $275.90 | Great for beginners, league players, and pros alike |
| 4569 | Big Bertha | $275.90 | Great for beginners, league players, and pros alike. |
| 4570 | War Bird | $290.50 | Great results with giant sweet spot. |
| 4571 | War Bird | $290.50 | Great results with giant sweet spot. |

Special features include a single sight line in the cavity for easy alignment and a fine CNC-milled face for a consistent flat face with exceptionally close tolerances.

Irons

| ID Code | Product | Price | Description |
|---|---|---|---|
| EX999 | XJ Experimental | $500.50 | Extra large head for any level player. |
| EX999L | XJ Experimental | $500.50 | Extra large head for any level player. |

Group 2 — Golf Inc.

The concentration of mass in the heel, toe and topline areas promotes maximum stability on off-center hits.

Wood Set

| ID Code | Product | Price | Description |
|---|---|---|---|
| 9020 | Distance XL | $350.50 | Includes driver, 3, 5, and 7 woods |
| 9021 | Distance XL | $350.50 | Includes driver, 3, 5, and 7 woods. |
| 9026 | Tour Edition | $390.50 | Includes driver, 3, 5, 7, and 9 woods. |
| 9027 | Tour Edition | $388.50 | Includes driver, 3, 5, 7, and 9 woods. |

Group 3 — Master Products

Added weight on the perimeter of the sole for increased accuracy on shots hit off-center as the cavities comprise more surface area than a flat surface.

Iron Sets

| ID Code | Product | Price | Description |
|---|---|---|---|
| 10345 | Pro Player | $288.50 | Standard iron set for the touring pro or weekend player. |
| 10346 | Pro Player | $265.50 | Standard iron set for the touring pro or weekend player. |
| 10390 | Standard Starter | $85.90 | Standard iron set for the beginner. |
| 10390 | Standard Starter | $99.90 | Standard iron set for the beginner. |

*Fig. 9A*

Group 4 — Ping

Special features include a single sight line in the cavity for easy alignment and a fine CNC-milled face for a consistent flat face with exceptionally close tolerances.

Putters

| ID Code | Product | Price | Description |
|---|---|---|---|
| 4580 | Ping Classic | $150.50 | Micro-balanced for consistant roll |
| 4581 | Ping Classic | $150.50 | Micro-balanced for consistant roll |
| 4582 | Ping Classic | $150.50 | Micro-balanced for consistant roll |
| 4583 | Ping Classic | $158.50 | Micro-balanced for consistant roll |

Group 5 — Spalding

The concentration of mass in the heel, toe and topline areas promotes maximum stability on off-center hits.

Wood Set

| ID Code | Product | Price | Description |
|---|---|---|---|
| 9085 | Masters | $200.50 | Includes driver, 3, and 5 wood. Great for handicap players |
| 9086 | Masters | $200.50 | Includes driver, 3, and 5 wood. Great for handicap players. |

Group 6 — Titlelist

10% larger hitting area make the XPC3 a top choice for any player seeking maximum forgiveness.

Irons

| ID Code | Product | Price | Description |
|---|---|---|---|
| 2135 | XPC3 Nickel | $38.50 | Promotes a softer feel favored by many middle- to lower-handicap players |
| 2136 | XPC3 Nickel | $34.50 | Promotes a softer feel favored by many middle- to lower-handicap players |
| 2137 | XPC3 Nickel | $41.50 | Promotes a softer feel favored by many middle- to lower-handicap players |
| 2138 | XPC3 Nickel | $41.50 | Promotes a softer feel favored by many middle- to lower-handicap players |

Group 7 — Wilson

Special features include a single sight line in the cavity for easy alignment and a fine CNC-milled face for a consistent flat face with exceptionally close tolerances.

Putters

| ID Code | Product | Price | Description |
|---|---|---|---|
| 6790 | Wilson Pro | $67.80 | Beveled head for point to point contact |
| 6791 | Wilson Pro | $67.80 | Beveled head for point to point contact. |

*Fig. 9B*

Table of Contents
Categorized listing

| | |
|---|---|
| Golf Clubs | 1 |
| *Calloway* | 1 |
| Drivers | 1 |
| Irons | 1 |
| *GolfInc* | 1 |
| Wood Set | 1 |
| *Master Products* | 2 |
| Iron Sets | 2 |
| *Ping* | 2 |
| Putters | 2 |
| *Spalding* | 2 |
| Wood Set | 2 |
| *Titleist* | 3 |
| Irons | 3 |
| *Wilson* | 3 |
| Putters | 3 |

*Fig. 9C*

Table of Contents
Alphabetized listing

D
Drivers  1

I
Iron Sets  1
Irons  1,2

P
Putters  2,3

W
Wood Set  1,2

*Fig. 9D* toolcribsupply      Phon ‎ 952-854-2422   Fax 952-942-7474

Cutting tools
Drills

HSS Jobber

| Description | PART NUMBER | Price |
|---|---|---|
| 1/16 JOBBER DRILL 150 | 44004 | $0.55 |
| 1/2 JOBBER DRILL 150 | 44032 | $4.26 |
| 1/4 E JOBBER DRILL 150 | 44016 | $1.15 |
| 1/8 JOBBER DRILL 150 | 44008 | $0.62 |
| 11/32 JOBBER DRILL 150 | 44022 | $2.15 |
| 11/64 JOBBER DRILL 150 | 44011 | $0.69 |
| 13/32 JOBBER DRILL 150 | 44026 | $2.91 |
| 13/64 JOBBER DRILL 150 | 44013 | $0.87 |
| 15/32 JOBBER DRILL 150 | 44030 | $4.00 |
| 15/64 JOBBER DRILL 150 | 44015 | $1.06 |
| 17/32 JOBBER DRILL 150 | 44034 | $8.55 |
| 17/64 JOBBER DRILL 150 | 44017 | $1.32 |
| 19/32 JOBBER DRILL 150 | 44038 | $9.98 |
| 19/64 JOBBER DRILL 150 | 44019 | $1.58 |
| 21/32 JOBBER DRILL 150 | 44042 | $12.02 |
| 21/64 JOBBER DRILL 150 | 44021 | $1.92 |
| 23/64 JOBBER DRILL 150 | 44023 | $2.42 |
| 25/64 JOBBER DRILL 150 | 44025 | $2.83 |
| 27/64 JOBBER DRILL 150 | 44027 | $3.23 |
| 29/64 JOBBER DRILL 150 | 44029 | $3.76 |
| 3/16 JOBBER DRILL 150 | 44012 | $0.79 |
| 3/32 JOBBER DRILL 150 | 44006 | $0.55 |
| 3/64 JOBBER DRILL 150 | 44003 | $0.59 |
| 3/8 JOBBER DRILL 150 | 44024 | $2.50 |
| 31/64 JOBBER DRILL 150 | 44031 | $4.18 |
| 33/64 JOBBER DRILL 150 | 44033 | $8.18 |
| 35/64 JOBBER DRILL 150 | 44035 | $9.24 |
| 37/64 JOBBER DRILL 150 | 44037 | $9.71 |
| 39/64 JOBBER DRILL 150 | 44039 | $10.95 |
| 41/64 JOBBER DRILL 150 | 44041 | $11.45 |
| 5/16 JOBBER DRILL 150 | 44020 | $1.76 |
| 5/32 JOBBER DRILL 150 | 44010 | $0.65 |
| 5/64 JOBBER DRILL 150 | 44005 | $0.55 |
| 5/8 JOBBER DRILL 150 | 44040 | $10.69 |
| 7/16 JOBBER DRILL 150 | 44028 | $3.36 |
| 7/32 JOBBER DRILL 150 | 44014 | $0.99 |
| 7/64 JOBBER DRILL 150 | 44007 | $0.59 |
| 9/16 JOBBER DRILL 150 | 44036 | $9.68 |
| 9/32 JOBBER DRILL 150 | 44018 | $1.36 |
| 9/64 JOBBER DRILL 150 | 44009 | $0.62 |

*Fig. 12A*

Phone 952-854-2422  Fax 952-942-7474

Cutting tools
End Mill-Carbide

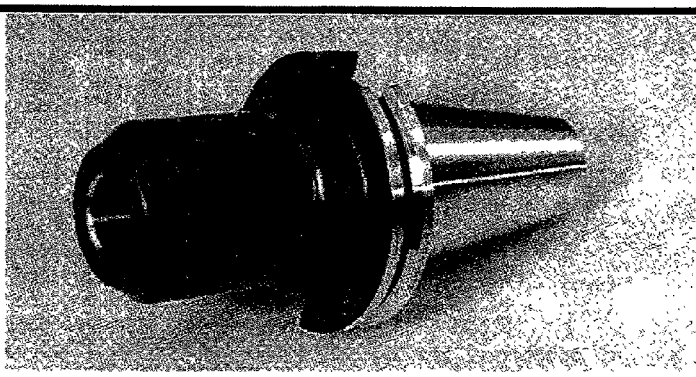

SE 4 FL

| Dia | LOC | OAL | PART NUMBER | Shank | Price |
|---|---|---|---|---|---|
| 1/16 | 3/16 | 1 1/2 | 30107 | 1/8 | $13.86 |
| 1/32 | 5/64 | 1 1/2 | 30103 | 1/8 | $17.00 |
| 1/64 | 1/32 | 1 1/2 | 30101 | 1/8 | $29.21 |
| 3/32 | 9/32 | 1 1/2 | 30111 | 1/8 | $13.86 |
| 3/64 | 7/64 | 1 1/2 | 30105 | 1/8 | $17.00 |
| 5/64 | 3/16 | 1 1/2 | 30109 | 1/8 | $13.86 |
| 7/64 | 3/8 | 1 1/2 | 30113 | 1/8 | $13.86 |

Holders

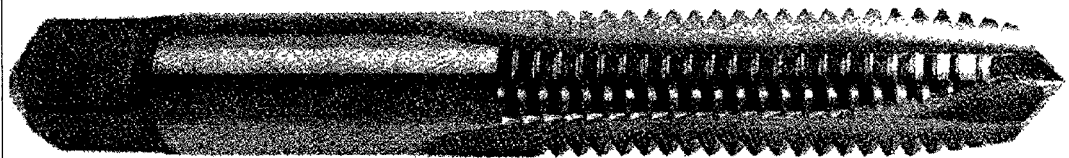

Cat 40 Endmill

| A DIA | B DIA | C DIM | D DIM | E DIM | PART NUMBER | SYTLE |
|---|---|---|---|---|---|---|
| 0.125 | 0.68 | 1.75 | 3 | 0.19 | C40-01EM1 | 1 |
| 0.188 | 0.68 | 1.75 | 3 | 0.44 | C40-18EM1 | 1 |
| 0.25 | 1 | 3 | 3 | 0.44 | C40-25EM3 | 2 |
| 0.5 | 1.25 | 6 | 3.8 | 0.88 | C40-50EM6 | 3 |
| 0.75 | 1.75 | 3.5 | 3.94 | 1 | C40-75EM3 | 2 |

Milling Cutter
Ball Nose Finisher

| Diameter | Eff Length | Neck Dia | OAL | PART NUMBER | Shank Dia | Screw | Price |
|---|---|---|---|---|---|---|---|
| 0.312 | 1.906 | 0.295 | 5.5 | GWR 08 140 0500 RZK | 0.5 | GWS 08 | $100.00 |
| 0.375 | 1.344 | 0.335 | 3.562 | GWR 10 90 0500 RZ | 0.5 | GWS 10 | $100.00 |
| 0.375 | 1.375 | 0.354 | 5.875 | GWR 10 150 0500 RZK | 0.5 | GWS 10 | $100.00 |
| 0.5 | 1.25 | 0.413 | 3.562 | GWR 12 90 0500 RZ | 0.5 | GWS 12 | $100.00 |
| 0.5 | 1.25 | 0.413 | 5.125 | GWR 12 130 0500 RZ | 0.5 | GWS 12 | $100.00 |
| 0.5 | 1.812 | 0.413 | 5.875 | GWR 12 150 0500 RZ | 0.5 | GWS 12 | $100.00 |
| 0.5 | 2.312 | 0.413 | 6 | GWR 12 160 0625 RZK | 0.625 | GWS 12 | $100.00 |

*Fig. 12B*

CATALOG BUILDING METHOD AND SYSTEM

RELATED APPLICATION

This application claims the benefit of U.S. Provisional Application Ser. No. 60/266,076, filed Jan. 31, 2001, under 35 U.S.C. 119(e).

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software, data and screen captures as described below and in the drawings attached hereto: Copyright© 2001, Computer Pundits, Inc. All Rights Reserved.

FIELD OF THE INVENTION

The present invention relates generally to the field of catalog creation. More particularly, the present invention relates to systems and methods for designing, building, and publishing a catalog.

BACKGROUND

Businesses constantly need to inform potential customers of the goods it has for sale or goods it has in stock for use by its various divisions. This need has been met in the past by publishing a printed catalog of the goods. Conventional publication of catalogs requires special skills in graphic design and layout. In the past these skills were carried out by hand by highly trained specialists. Computer programs have been developed to remove some of the handwork from graphic design but they still require a design specialist trained in graphic layout and the specific program being used or a technically skilled programmer. Trained specialists may still take as much as about two hours to prepare one page of a catalog for publication. This obviously adds a significant cost to publishing a catalog. Thus, while conventional publishing programs eased the manual burdens on the specialist they have not provided a means for a nonspecialist to produce a professional looking catalog.

Printed catalogs also have the draw back that they are expensive to produce, print and update. Paper is expensive. The overhead of professional printers is quite large. Some companies rely on a single printed catalog for at least one year or more. Printing an entire year's supply of catalogs requires professional high speed printing machinery. Such a catalog may quickly become out-of-date by listing products which are no longer carried, by not listing products that are carried, or by listing incorrect information about a product, e.g., changed specifications or price. Companies may lose sales if a customer does not find a product in the printed catalog or sees incorrect, outdated information, such as product specifications or price, in the printed catalog.

Compact disks, i.e., CD-ROMs, have become a widely used format for storing data due in part to their proliferation into personal computers (PC's). It is believed that most PC's sold in the past few years include a standard CD-ROM drive. CD-ROMs are also desirable due to their storage capacity, reliability and ease of use. CD-ROMs can store a large catalog on a single disk, which currently costs about one dollar or less. In contrast, printed paper catalogs cost from about $10.00 to $70.00. Moreover, due to the relatively small size of CD-ROMs relative to large catalogs there is considerable postage savings when catalogs are stored on CD-ROMs.

Computer networks, such as the Internet, have become a tremendous information resource tool used by many companies and its customers. Even more, the Internet is a powerful agent which is transforming the way nearly every product and service is sold or provided. With countless internet service providers proliferating at an extremely rapid rate, the competition to develop consumer loyalty and hold the consumer's attention for repeat business is critical. Service and accessibility is also critical. Thus, there is a need for a current and up-to-date presence on the Internet.

Consequently, there remains a need to provide improved systems and methods for producing catalogs that allow a business to produce its own catalog at a reduced cost relative to conventional catalog publishing. The systems and methods must be relatively easy for a person, not having specialized publishing training, within the business to produce the catalog. Moreover, there is a need to provide catalog publication software that does not require special hardware which would not be found in a typical office or which would require specialized publishing training.

There is also a need in businesses that use catalogs to inform customers of its products to publish its catalog in multiple mediums. Different customers may prefer or require catalogs or information from the catalog in different formats, e.g., print, electronic, machine-readable storage. However, conventional catalog publishers do not provide catalogs that are readily adaptable to multiple formats even if multiple formats happen to be offered. Moreover, conventional methods for producing catalogs in multiple formats require a plurality of different data formats.

Many marketers produce catalogs to inform customers of the products that the marketer offers. However, due to the cost of producing a catalog usually only a single catalog of the marketer's products is published. This restricts the ability of the marketer from targeting specific customers. For example, certain customers may only be interested in a certain sub-group of products offered by the marketer. The customer may find it difficult to find the specific products that he is interested in a large, general catalog. Moreover, a marketer may be restricted in how often it can publish a catalog, thereby restricting seasonal promotions. Customers today are becoming accustomed to accurate, current and prompt product information, such as price, discounts, etc. Consequently, a marketer must provide such information. Accordingly, there is a need to easily produce targeted catalogs within an economical budget.

SUMMARY OF THE INVENTION

The above-mentioned problems associated with conventional catalog publishing, as well as other problems, are addressed by the present invention and will be understood by reading and studying the following specification. Systems and methods are described which afford businesses the ability to publish a catalog on their own.

An illustrative embodiment of the present invention includes a system and method for catalog publication in either an electronic format or a paper format. Another embodiment of the present invention includes a system and method for automatically scanning a preexisting database for the database fields and importing them into the catalog database. This allows a user without knowledge of database programming to set up a catalog database that can communicate with the preexisting database without the user programming the interface or having extensive knowledge of the preexisting database. Another embodiment provides catalog templates into which the catalog data is organized. This allows a user to produce a catalog without performing extensive layout and graphic design.

In another embodiment of the present invention, the catalog is stored on a machine-readable media including software to search the catalog database and produce outputs from the catalog. The outputs include printed and electronic versions of all or only a select part of the catalog. The outputs include a plurality of different types of electronic versions such as facsimile, portable document format, rich text format, and report document file format. One form of the machine-readable media is a CD. In an embodiment, the catalog is dynamically searchable.

Yet another embodiment of the present invention produces a dynamically searchable web page for use on computer networks. The dynamic web page includes links back to the catalog database that query the database for requested data. Based on the data received in reply to the queries, the web page is automatically updated.

These and other embodiments, aspects, advantages, and features of the present invention will be set forth in part in the description which follows, and in part will become apparent to those skilled in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

FIG. 9A-9D are pages of a catalog created by the teachings of the present invention.

FIGS. 12A-12C are catalog images in which the null data fields are ignored as each product grouping does not have all of the catalog database fields.

DETAILED DESCRIPTION

In the following detailed description, reference is made to the accompanying drawings which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1A:
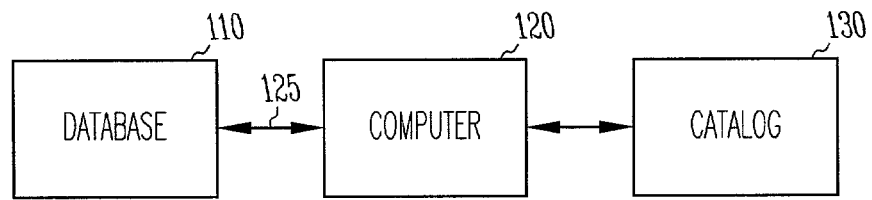
FIGS. 1A and 1B are block diagrams of a system according to the teachings of the present invention.

FIG. 1A is an illustration of a system 100 according to the teachings of the present invention. The system 100 includes a database 110, which includes a plurality of records of products. Each record may include a plurality of data fields. Database 110 may be stored in any electronic, magnetic, optic storage medium as is known to one of ordinary skill in the art. Ideally, the database 110 is in a conventional database format that is ODBC-compliant such as Microsof™ Access. A computer 120 is connected to the database 110 through a communication line 125. Communication line 125 includes, but is not limited to, an internal bus, telephone lines, wireless communication paths, LAN, WAN, global computer network (e.g., Internet). In one embodiment of the invention, computer 120 is a personal computer having a Pentium II processor, 64 Mb of RAM and 100 Mb of available disk space. It will be understood that the present invention can be practiced on computers having superior computing power in terms of processor, speed, and memory than the exemplary embodiment. Computer 120 operates software for performing the method according to the present invention and retrieves product data from the database 110. Computer 120 produces catalog 130 based on the retrieved data. It is within the scope of the present invention for catalog 130 to be stored in electronic form in or outside computer 120, to be in a printed form, to be stored in a magnetic media, to be stored in an optical media, or uploaded onto a computer network, e.g., on an intranet or on the internet as an Internet catalog.

The computer 120 includes a processing unit, a system memory, and a system bus that operatively couples various system components including the system memory to the processing unit. There may be only one or there may be more than one processing unit, such that the processor of computer 120 comprises a single central-processing unit (CPU), or a plurality of processing units, commonly referred to as a parallel processing environment. The computer 120 may be a conventional computer, a distributed computer, or any other type of computer; the invention is not so limited. The system memory can also be referred to as simply the memory, and may include read only memory (ROM) and random access memory (RAM). A basic input/output system (BIOS), containing the basic routines that help to transfer information between elements within the computer 120, such as during start-up, may be stored in ROM. The computer 120 further includes a hard disk drive for reading from and writing to a hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-readable instructions, data structures, program modules and other data for the computer 120. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, can be used in the exemplary operating environment.

A user may enter commands and information into the personal computer 120 through input devices such as a keyboard and pointing device, e.g., mouse. The user may further enter data for a catalog using a digital camera or a bar code reader. Other input devices can include a microphone, joystick, game pad, satellite dish, scanner, or the like. These other input devices are often connected to the processing unit through a serial port interface that is coupled to the system bus, but can be connected by other interfaces, such as a parallel port, game port, or a universal serial bus (USB). A monitor or other type of display device can also be connected to the system bus via an interface, such as a video adapter. The monitor can display a graphical user interface for the user. In addition to the monitor, computers typically include other peripheral output devices, such as speakers, printers, and CD-ROM writable drives.

The hardware and operating environment in conjunction with which embodiments of the invention may be practiced has been described. The computer 120, in conjunction with which embodiments of the invention can be practiced, is not limited to the computer herein described.

Figure 1B:
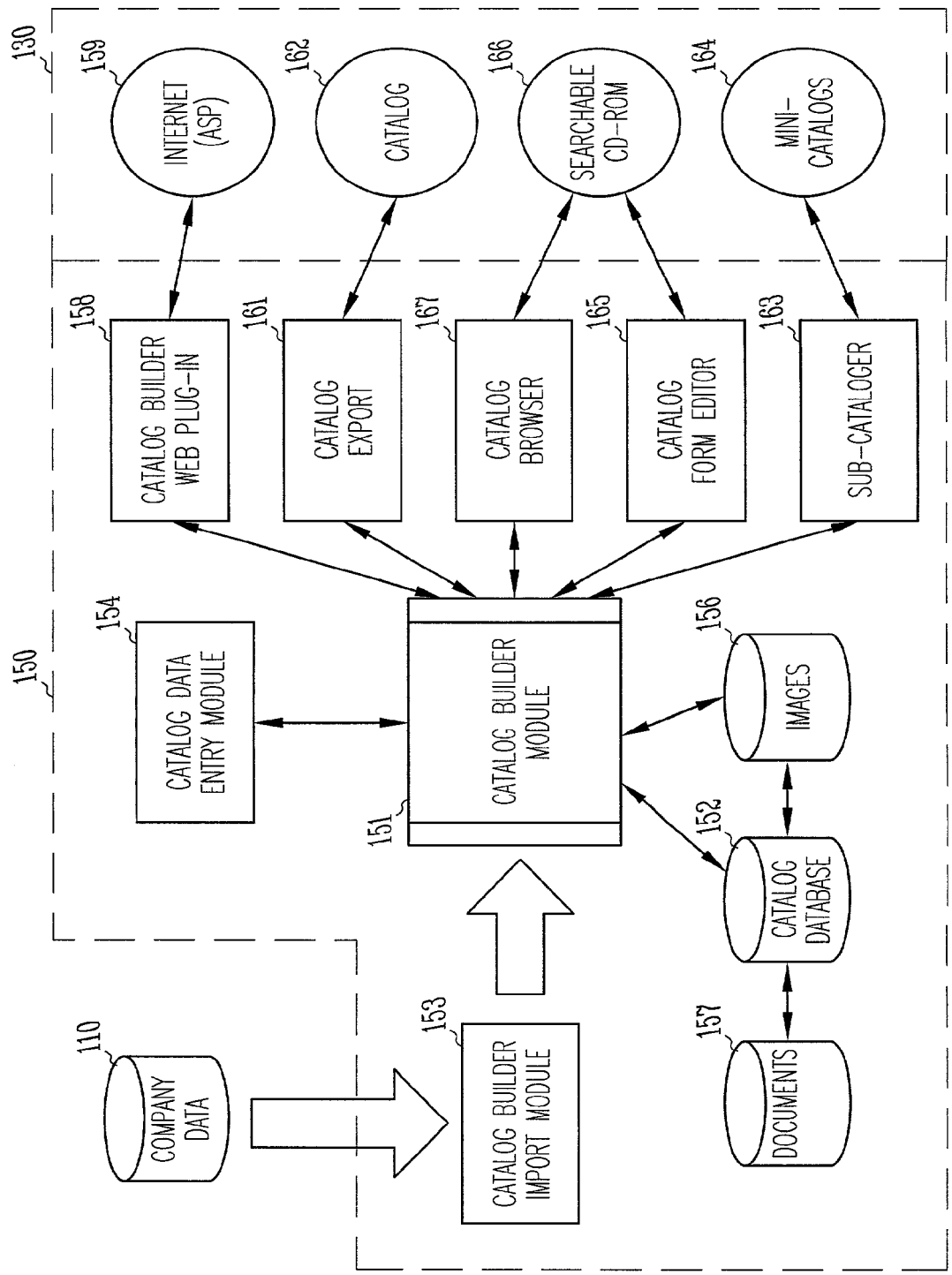

FIG. 1B shows a system 150 according to the present invention, which system may include computer 120, in communication with the company or second database 110. The catalog outputs 130 are generated by and communicate with the system 150. The company database 110 may be of any format including, for example and not by way of limitation, delimited text, MS SQL, MS Access, or MS Excel. The system 150 comprises a catalog builder module 151 that builds a catalog or first database 152. In one embodiment, the catalog database 152 is formatted in MS SQL or MS Access formats. The catalog builder module 151 sets up data fields for the catalog database 152. In an embodiment, module 151 scans the company database 110 and retrieves the names of the data fields in the company database 110. The module 151 sets up the same data fields in its catalog database 152. In one embodiment, catalog builder module creates and stores the catalog database 152 in MS SQL format or MS Access format. A catalog builder import module 153 automatically retrieves data from the company database 110, which data is linked to the data fields in the catalog database by catalog builder module 151, and delivers the data to catalog builder module 151. A catalog data entry module 154 allows the user to manually input and/or edit data into the catalog builder module 151. Thereafter, the data is stored in the input data in catalog database 152. Catalog builder module 151 also creates and stores an image database 156. In an embodiment, the image database 156 stores the images and a link to specific data fields in the records stored in catalog database 152. In an embodiment, the specific records or group of records in the catalog database include links to specific images in the image database 156. In an embodiment, the image database 156 itself stores links to the storage location of the images. Accordingly, the image database 156 is accessed, which in turn links to the image location to retrieve the image and provide it to the catalog. This is done at the time of building the catalog. In an embodiment, the images are retrieved on an as needed basis. Thus, images are stored in the image database in one embodiment. In one embodiment, the images are stored outside the image database and links to the images are stored in the image database. The image database 156 is adapted to store images in a plurality of formats including, but not limited to, BMP, GIF, JPEG, ICO, and TIFF formats. Moreover, the catalog builder module includes instructions on the storage and display of images. Many images are stored in a high resolution for greatest picture quality. However, high resolution images are quite large and require significant machine-readable storage. Catalog builder may store the images in a high resolution but limit the display of the image in a low resolution form. For example, when the catalog is displayed on a computer network the present invention limits the images to low resolution so as to not tie up computer network resources, i.e., bandwidth, with image files. Storing images in low resolution is also desirable when storing the catalog on a machine-readable media so that all of the required data can fit on a single media.

Catalog builder module 151, in an embodiment, creates a document data base 157. Document database 157 stores documents that provide further details about items that are listed in the catalog database. Examples of documents in the document database include material safety datasheets (MSDS), specifications, user manuals, etc. In an embodiment, the document database 157 includes links to where the actual document images are stored. Thus, the amount of data in the document database is reduced while allowing customers who require the additional documentation the ability to access the documents as needed.

System 150 further includes a plurality of output modules connected to catalog builder module 151. A catalog builder web plug-in module 158 communicates with catalog builder module 151 and builds an interactive, dynamic web page 159 that queries the catalog database 152 and the image database 156 through the catalog builder module. Module 158 thus creates a web page 159 that dynamically changes based upon input through links on the web page and data retrieved from database 152. This allows the user of the present invention to create web page 159 that is interactive with the catalog database 152 to present the catalog on a computer network, such as intranet, internet, or world wide web. The user does not need to program each page of the catalog into web pages as the present invention queries the database and updates the web page 159 based on data read from the catalog database 152. This also allows the web page 159 to be automatically updated when the catalog database 152 changes.

Another catalog output module is catalog export module 161, which interacts with catalog database 152 to produce hard copies, electronic, and facsimile versions 162 of all or select portions of the catalog. Sub-cataloger module 163 interacts with the catalog database 152 to produce smaller, mini-catalogs in hard copies, electronic, PDF (portable document format) and facsimile versions 164. By using the sub-cataloger module 163, the system can produce a small size catalog that is targeted to the needs of a specific customer. Hard copies of the catalog 162 or mini-catalogs 164 are printouts on paper. Electronic versions of the catalog 162 or mini-catalogs 164 include PDF format documents, electronically stored documents and documents stored on machine readable media, for example magnetic disk, CD-ROM, and computer memory. Catalog form editor module 165 determines the layout of the catalog and interprets the data stored in catalog database 152 to appear in the layout, for example stored on CD-ROM 166. Thus, catalog form editor 165 places catalog database 152 on the CD-ROM 166, which now can be distributed as the catalog.

When the catalog is distributed on a machine-readable media such as CD-ROM 166, it is desirable to provide customer interfaces that allow the customer to view, search, and interact with the catalog. Catalog browser module 167 defines a search engine for the database stored on the CD-ROM 166. It is within the scope of the present invention to store the database on other forms other than CD-ROM 166 including DVD, computer memory, other optical, magnetic and electronic storage media, and interact same with the catalog form editor module 165 and catalog browser module 167.

As explained in connection with FIGS. 1A and 1B, the present invention is implemented using computer based systems which have computer readable medium for executing instructions from software means, e.g., programs, for carrying out the herein described embodiments. One of these embodiments is a method for producing a catalog comprising inputting catalog data fields, ordering the catalog data fields in a hierarchy, linking the catalog data fields to database fields, reading data from the database fields into the catalog data fields, and building a catalog from the data in the catalog data fields. The scope of the present invention includes other method embodiments which will be understood by one of ordinary skill in the art upon reading the present disclosure.

Figure 2:
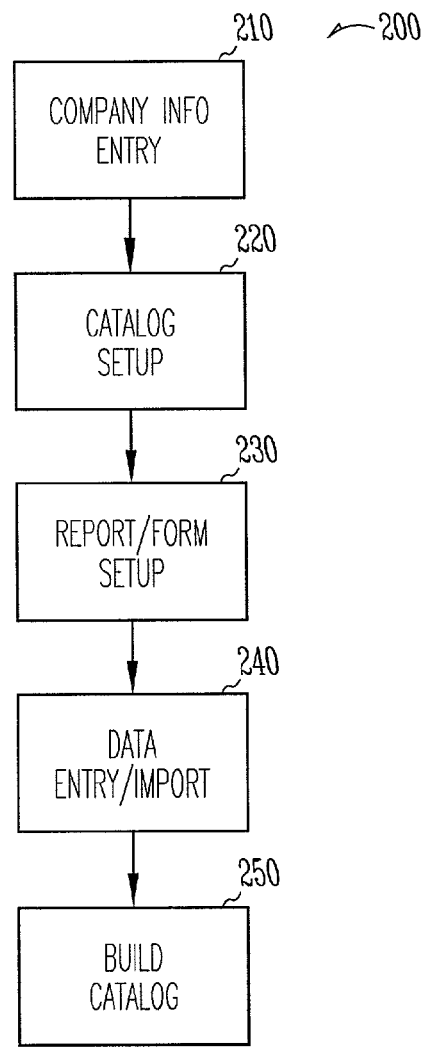
FIG. 2 is a simplified flowchart according to the teachings of the present invention.

FIG. 2 is a flow chart illustrating one method embodiment according to the teachings of the present invention. However, as one of ordinary skill in the art will understand upon reading the present disclosure other sequences are similarly included within the scope of the present invention. The method embodiment provided in FIG. 2 incorporates the software means having computer executable instructions. The method 200 shown in FIG. 2 includes five steps, namely, entering company information 210, setting up the catalog database fields 220, setting up the printed output report or machine-readable catalog form 230, entering or importing data 240, and building the catalog 250. These five steps are explained below with reference to FIGS. 3A through 7C.

Figure 3A:
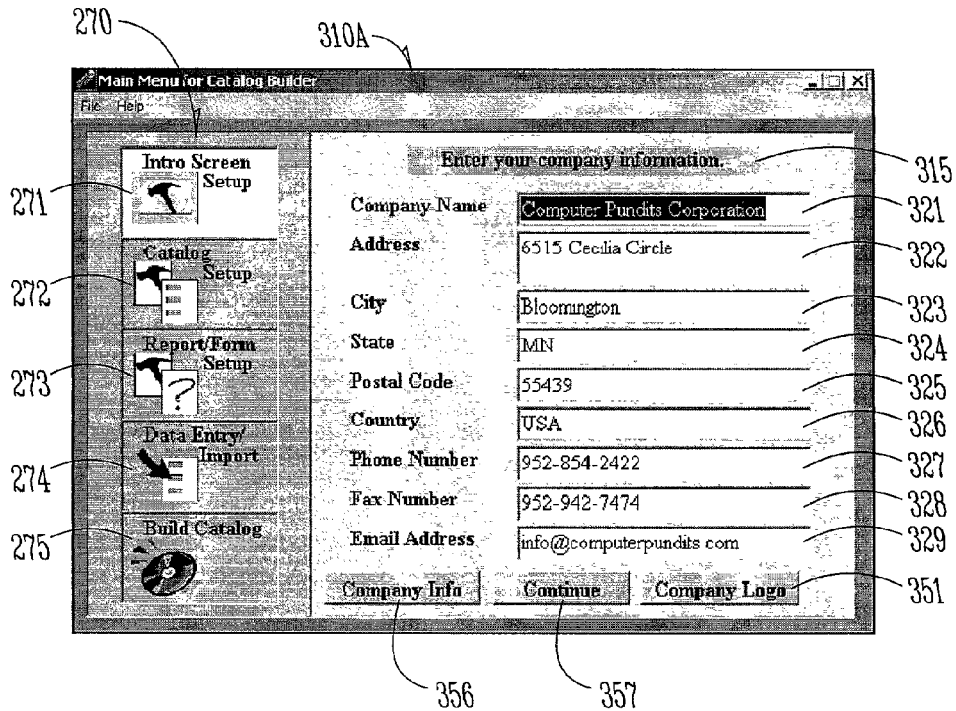
FIGS. 3A-3C are images of introduction setup computer screens according to the teachings of the present invention.
Figure 5A:
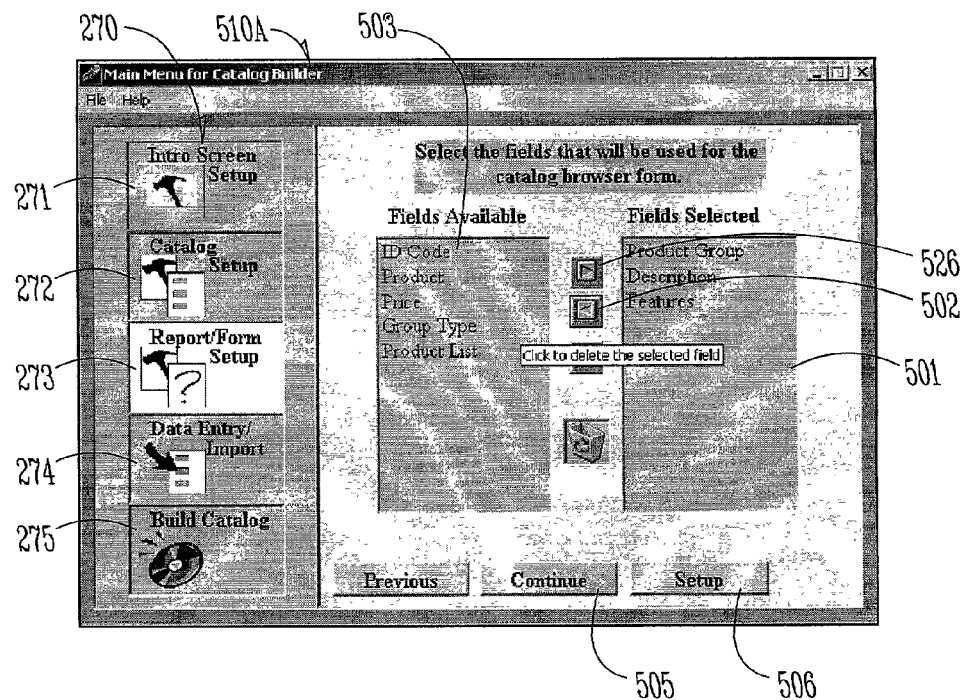
FIG. 5A-5L are images of a report/form setup computer screens according to the teachings of the present invention.
Figure 5B:
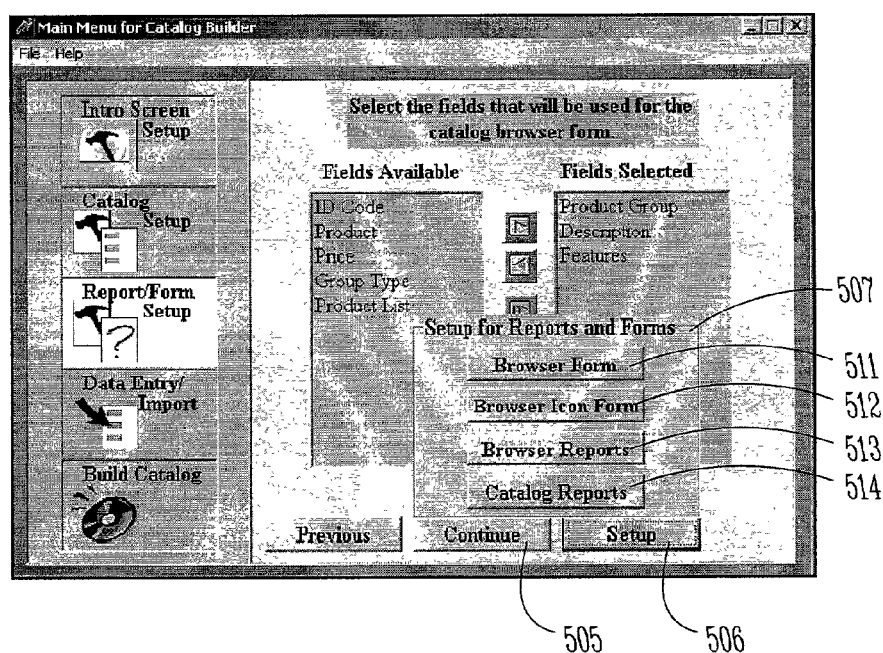
Figure 5C:
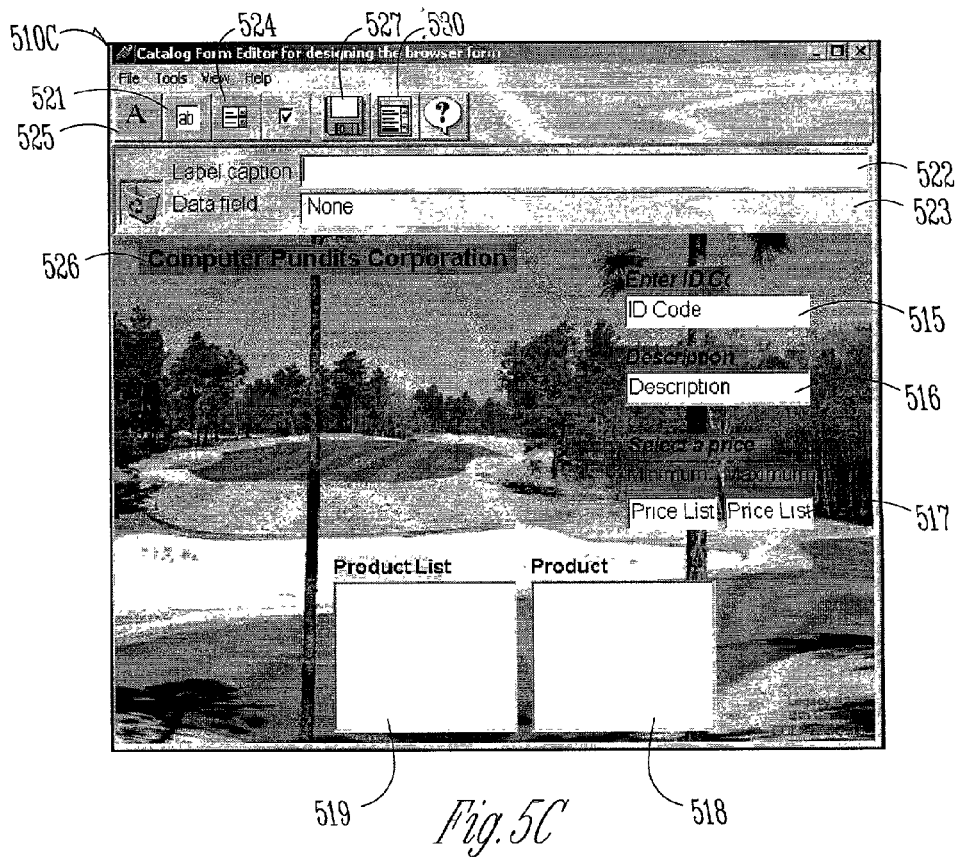
Figure 5D:
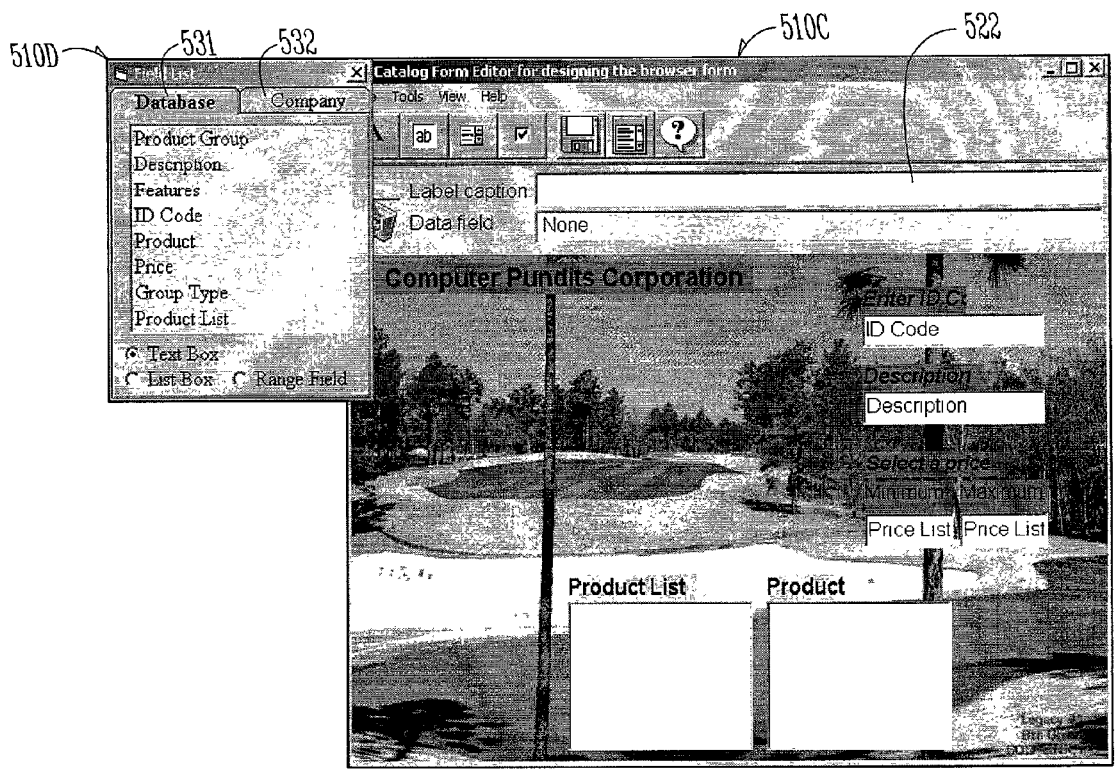
Figure 5E:
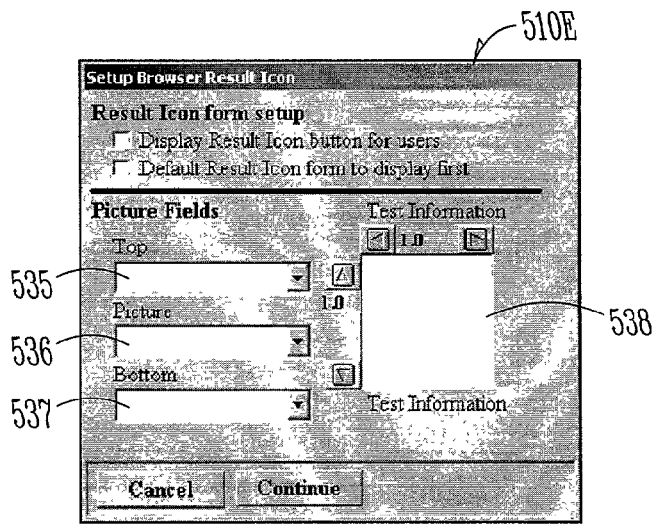
Figure 5F:
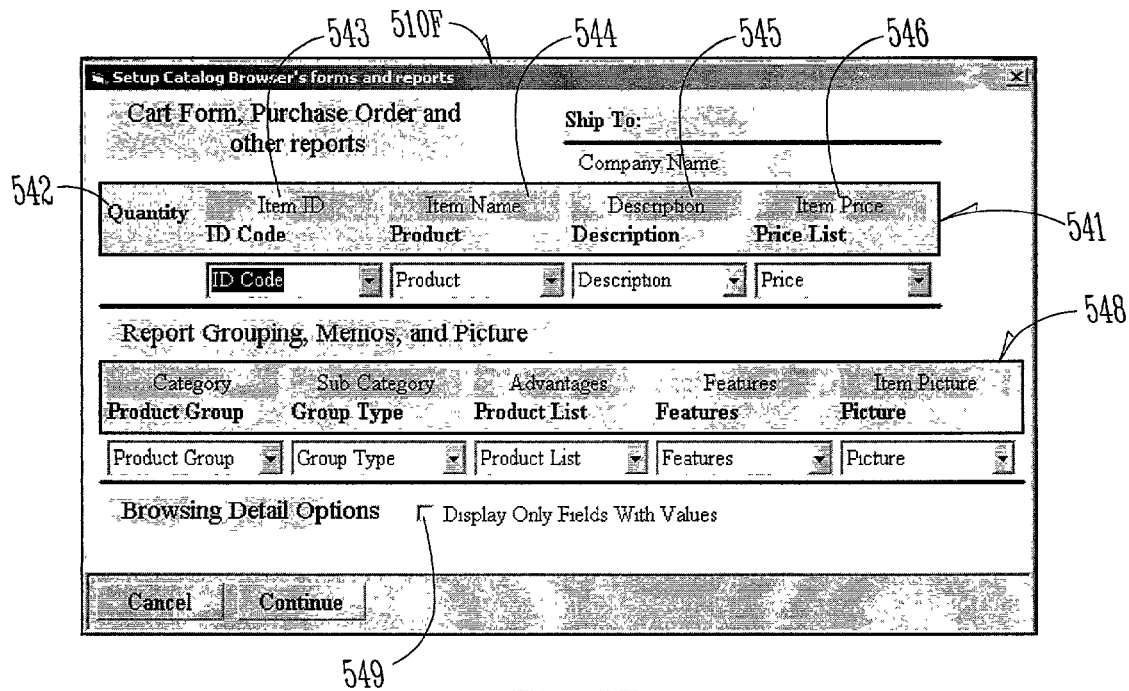
Figure 5G:
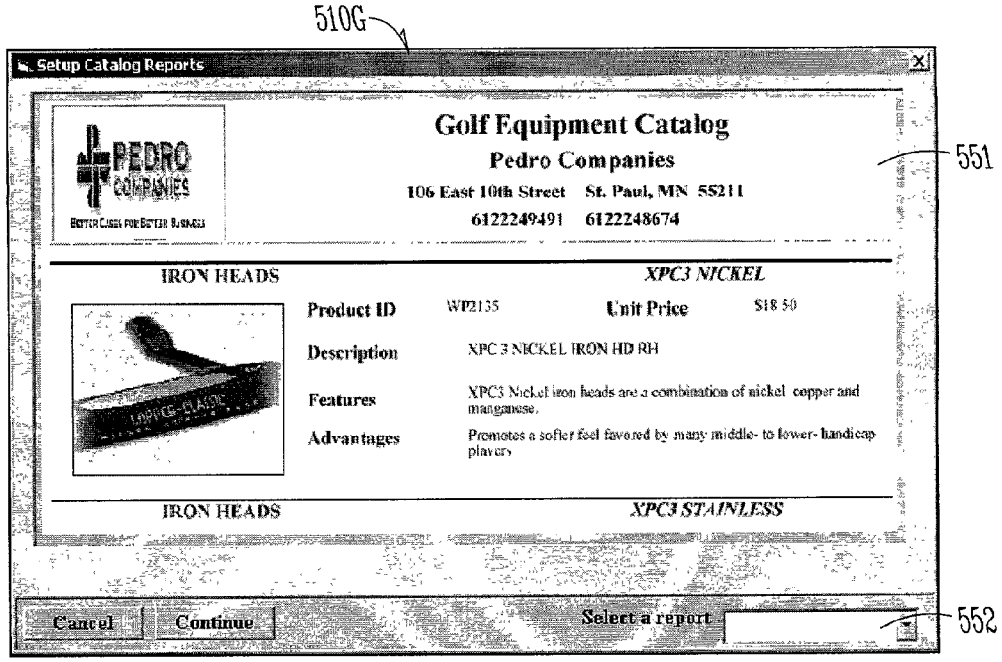
Figure 5H:
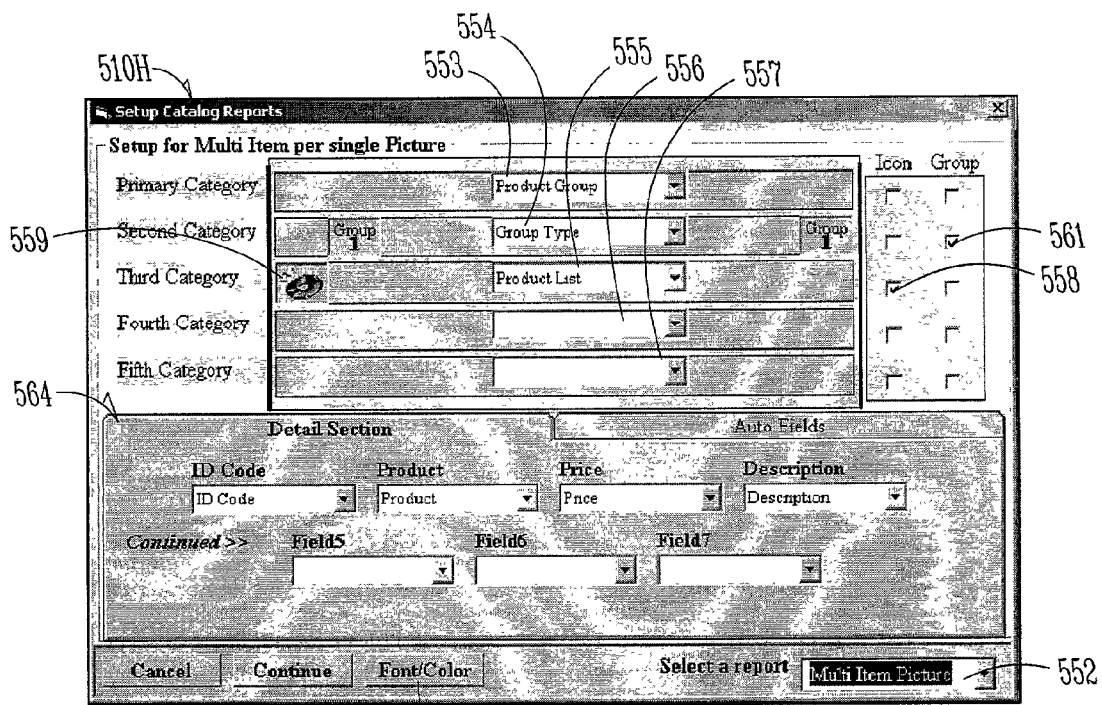
Figure 5I:
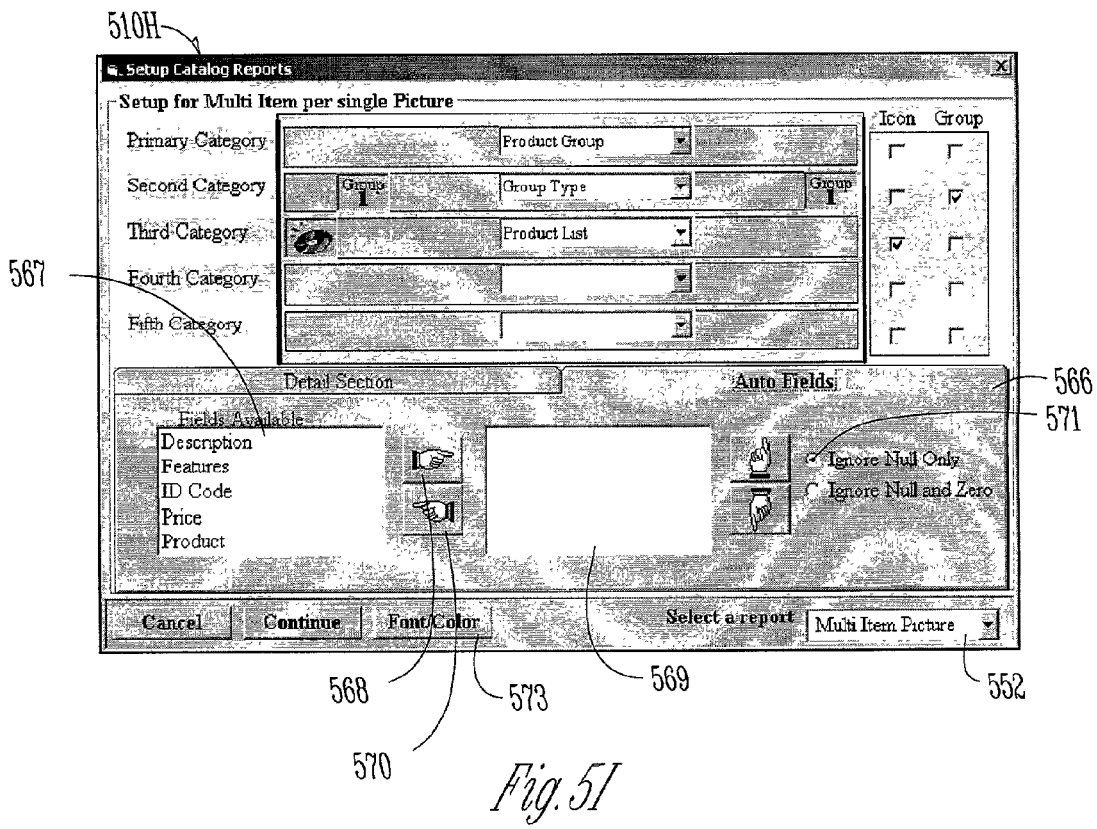
Figure 5J:
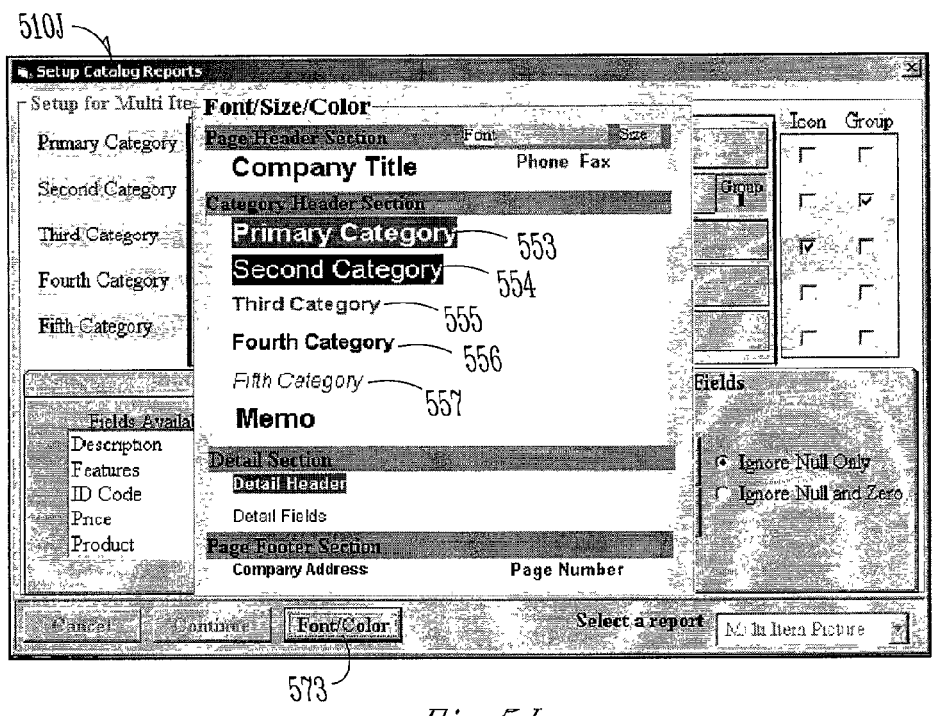
Figure 5K:
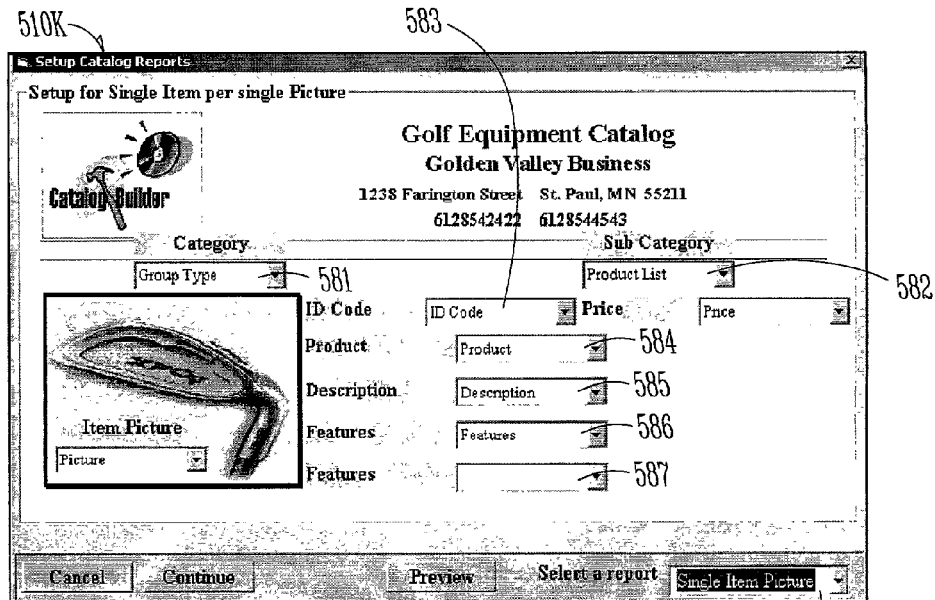
Figure 5L:
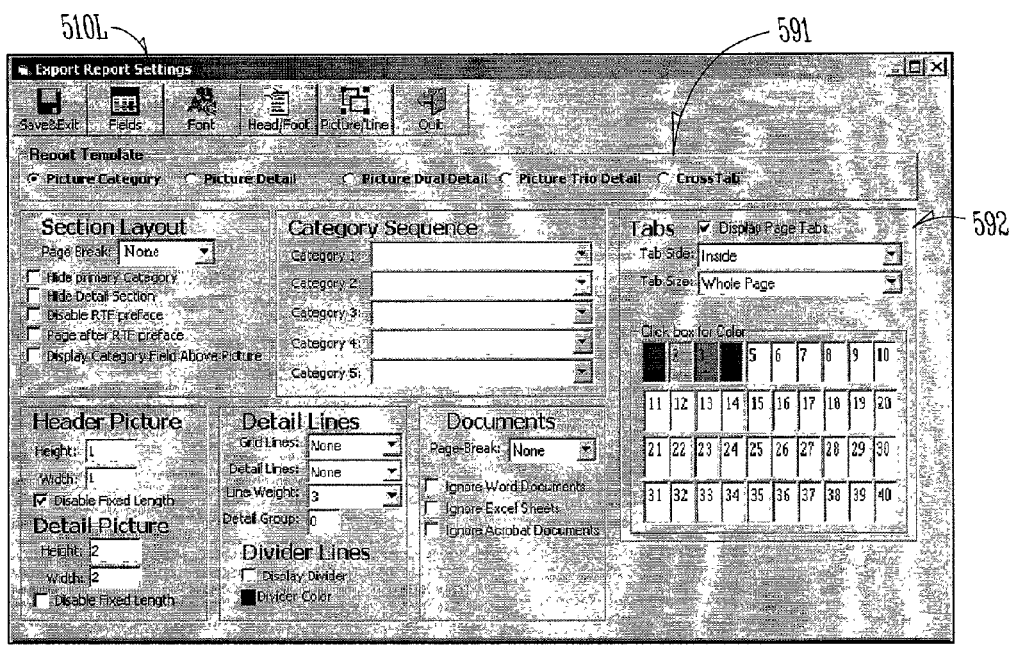
Figure 6A:
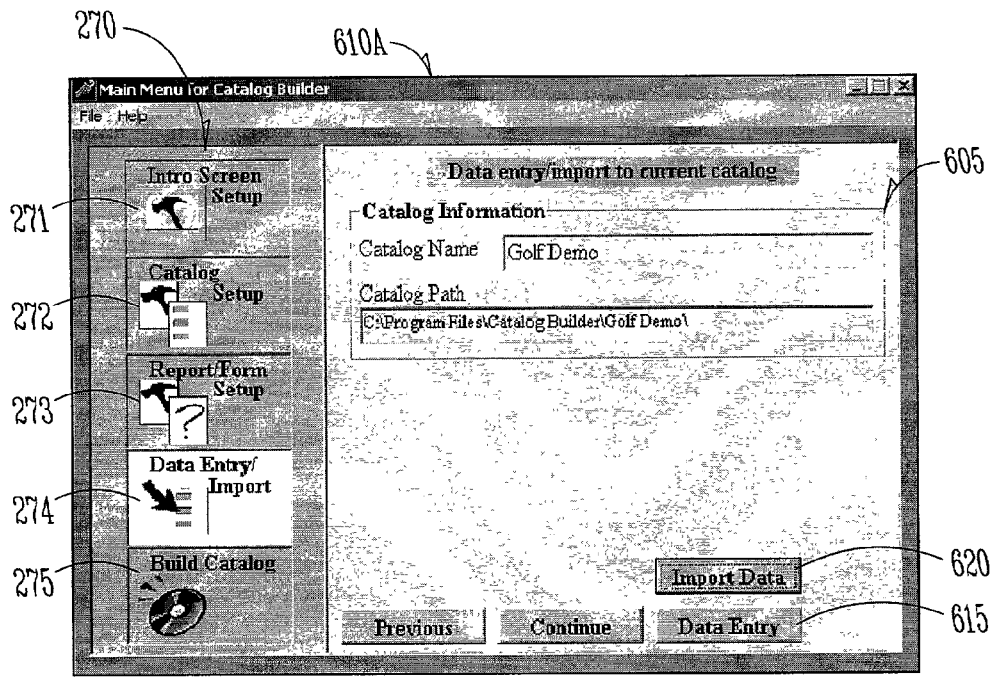
FIGS. 6A-6F are images of data entry/import computer screens according to the teachings of the present invention.
Figure 6B:
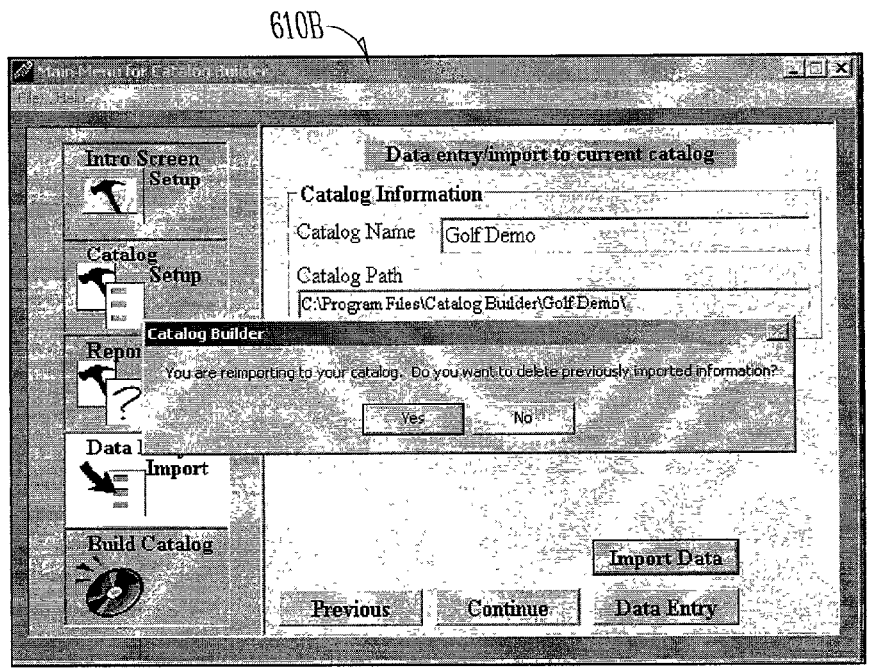
Figure 6C:
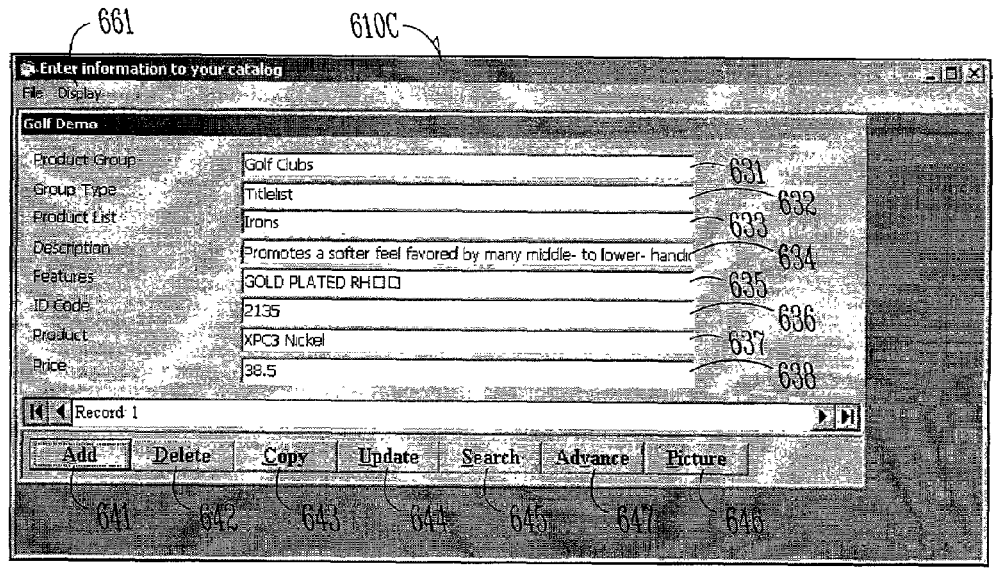
Figure 6D:
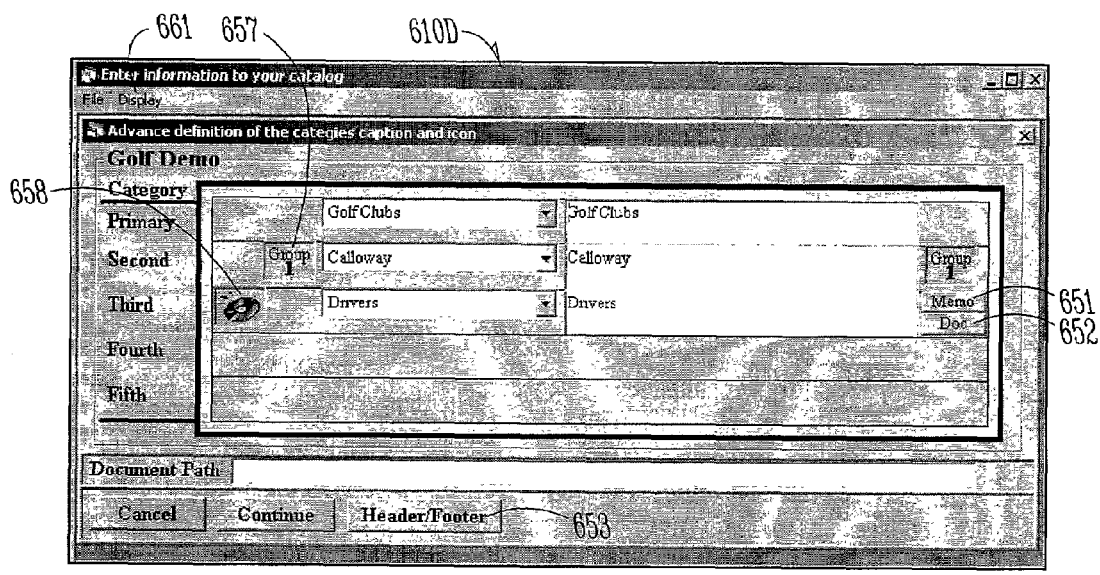
Figures 6E, 6F:
Figure 7A:
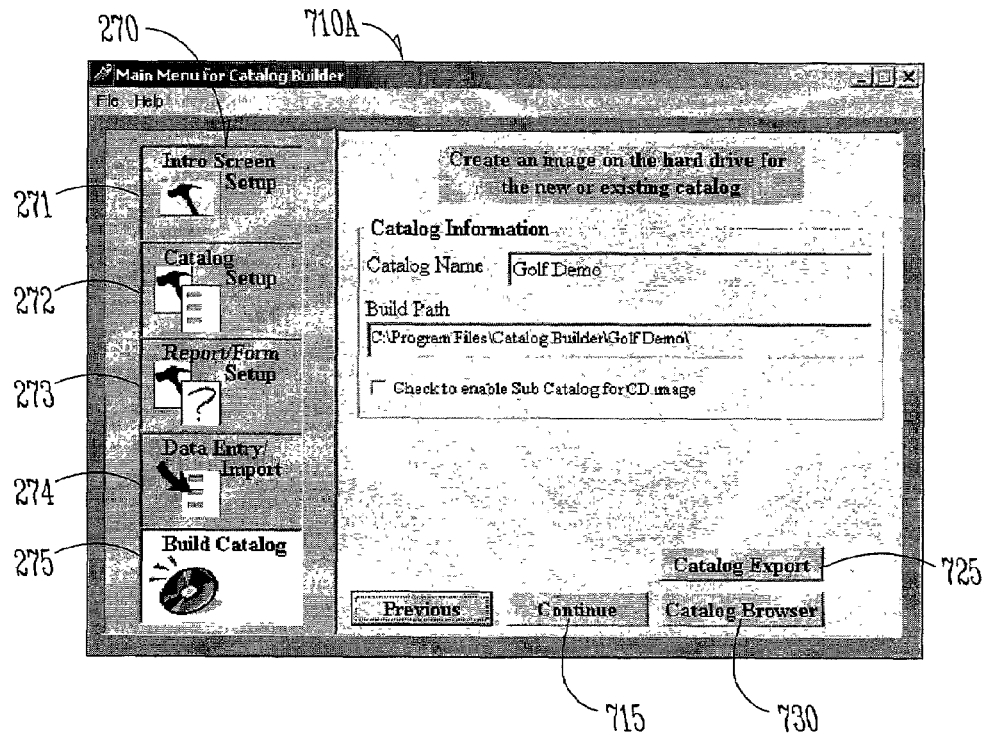
FIG. 7A is an image of a build catalog computer screen according to one embodiment of the teachings of the present invention.
Figure 7B:
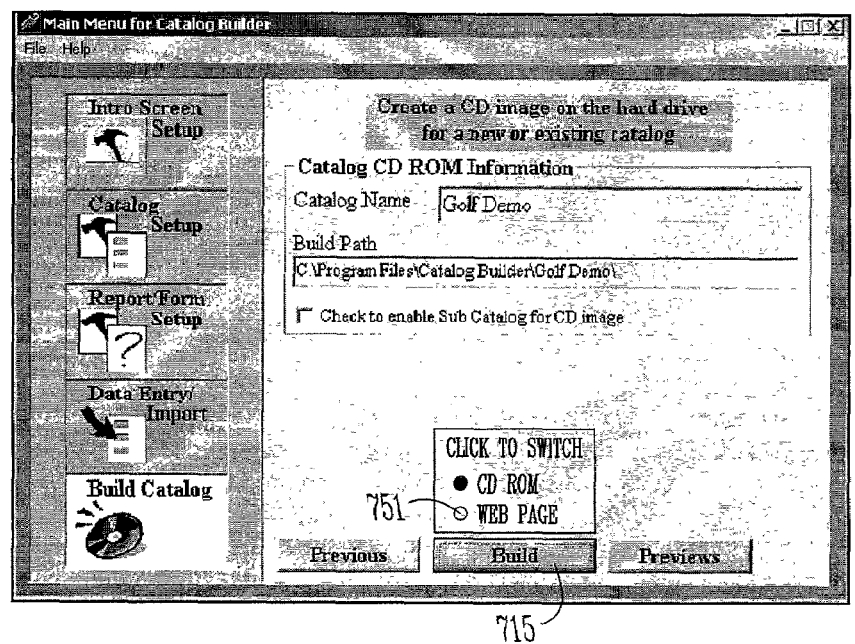
FIGS. 7B and 7C are images of a build catalog computer screen according to another embodiment of the teachings of the present invention.
Figure 7C:
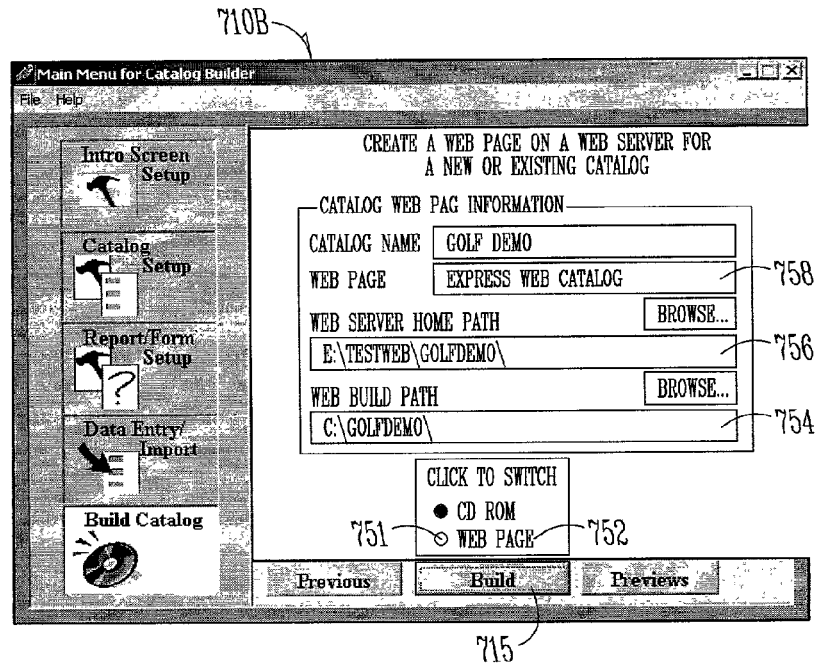

Each of FIGS. 3A through 7C indicates which step 210, 220, 230, 240 or 250 is being performed and where in the catalog building process the current step is by highlighting one icon in a column of five icons 270 positioned on the left of each of computer screens 310, 410, 510, 610 and 710. The uppermost icon 271 represents the entering company information step 210. Icon 271 is highlighted only on screens 310A and 310B as shown in FIGS. 3A and 3B. Icons 272-275 are not highlighted on screen 310. Icon 272 is below uppermost icon 271 and represents catalog database fields setup step 220. Icon 272 is highlighted only on screen 410 as shown in FIGS. 4A-4C. Icons 271 and 273-275 are not highlighted on screen 410. Icon 273 is below icon 272 and represents report/form setup step 230. Icon 273 is highlighted only on screen 510 as shown in FIGS. 5A-5L. Icons 271, 272, 274, and 275 are not highlighted on screen 510. Icon 274 is below icon 273 and represents data entry/import step 240. Icon 274 is highlighted only on screen 610 as shown in FIGS. 6A-6B. Icons 271-273 and 275 are not highlighted on screen 610. Lowermost icon 275 is below icon 274 and represents build catalog step 250. Icon 275 is highlighted only on screen 710 as shown in FIGS. 7A-7C. Icons 271-274 are not highlighted on screen 710. The highlighting of the appropriate icon in accord with the step being performed provides the user of the present method with a visual indicator of which step in the method is being performed.

FIG. 3A shows a computer screen 310A in which a user enters the company information (step 210 as shown in FIG. 2). In order to assist a novice user the company information input screen 310A, has an "Enter your company information." label 315. Screen 310A has a company name field 321 in which the user enters, e.g., types via a keyboard, the company name, here shown as Computer Pundits Corporation. Screen 310A has additional company information fields, including, but not limited to, address field 322, city field 323, state field 324, postal code field 325, country code field 326, telephone number field 327, fax number field 328, and email address field 329. Each field 321-329 is labeled, here shown directly to the left of each field, to direct the user as to what information is entered into each field. The company information is stored in the memory associated with the software performing the present invention. As explained herein, the company information is used to identify the company, promote the company, and provide company contact information in the catalog outputs such as machine readable data, CD-ROM stored catalogs, screen images of the catalog, screen images of catalog interfaces, printed documents created by the present method from the catalog, and electronic documents created by the present method from the catalog. The company information thus is only entered once into the method and is stored for a plurality of uses associated with the presentation of the catalog. Moreover, the present software is not dedicated to a single company and can be used by a plurality of companies to produce catalogs which include information for that specific company.

Figure 3B:
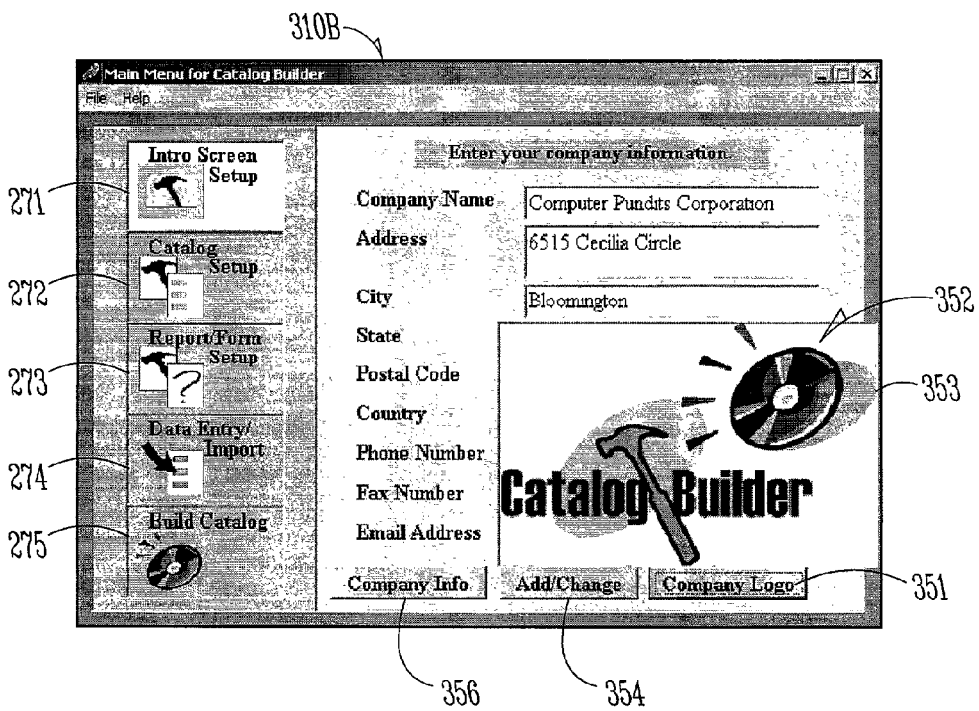

FIG. 3B shows the computer screen 310B similar to computer screen 310A and both are within the enter company information step 210. It will be recognized that screen views are labeled with the same alphabetic character as the figure on which the screen view appears. Screen 310B has the company logo button 351 selected. Selecting button 351 displays, if one has been previously selected, a graphic 352 in a pop-up window 353. The center button 354 on screen 310B, when selected, allows a user to enter the location of another electronically stored image to add as the company logo graphic 352 or to change the company logo graphic 352. The present method returns to the company information entry screen 310A simply by again pressing the company logo button 351, which closes window 353.

Figure 3C:
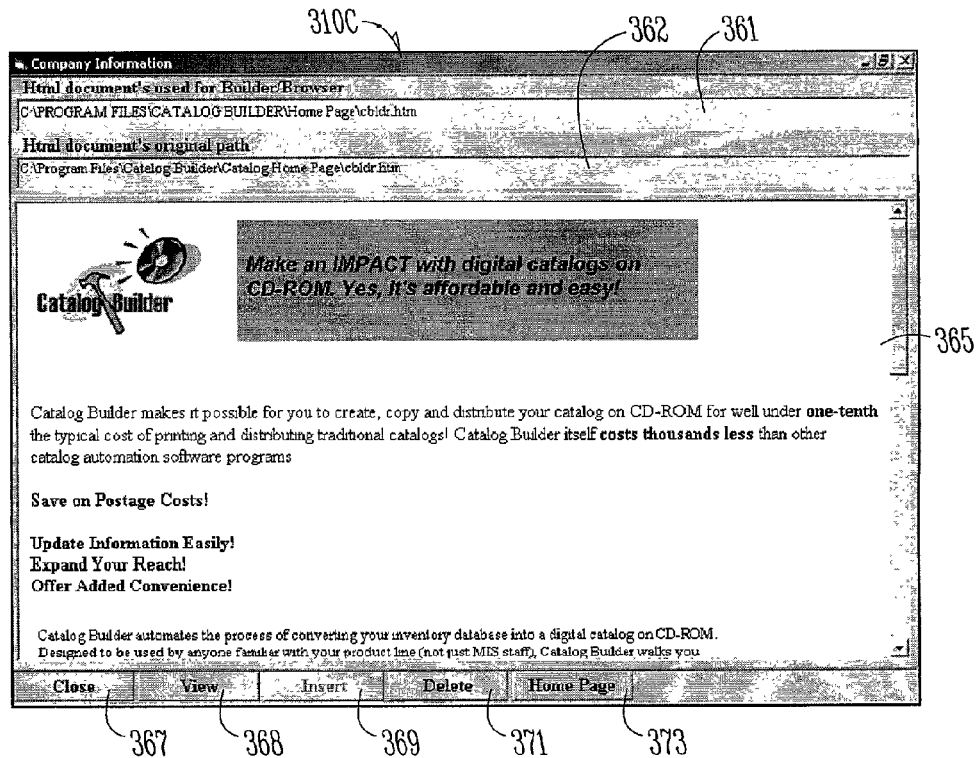

FIG. 3A further shows a company info button 356, which, when pressed, allows the user to attach a company information document to the catalog being created. FIG. 3C shows an embodiment of screen 310C for attaching a company information document. In this embodiment, the information document is an html document that will be added to the catalog being created. The company information document provides the person receiving catalog with information about the company and its products and may further include links to the company's website. This allows the recipient of the catalog another convenient means for finding further information on the company. FIG. 3C shows the location of the html document for use in the builder/browser of the present disclosure and the original location of the document respectively in fields 361 and 362. The html company information document 365 is shown below fields 361 and 362. A close button 367 is positioned at the bottom of FIG. 3C. Pressing close button 367 returns the present method to screen 310A. View button 368 opens up a browse window, which allows a user to browse the directory of the computer to attach the company information document using a graphical user interface. Insert button 369 loads the html document listed in the html document's original path field 362 into the catalog. Thus, document 365 now resides in the catalog and can be attached to any copy of catalog output built by the present method. The delete button 371 removes the document from the catalog. Home page button 373, when pressed, returns the user to the beginning of the attached html company information page. Thus, the present method allows the designer of the catalog to embed additional information about the company into the catalog without programming or layout tasks. The designer merely searches through the directory of the computer for the name of the document. The user selects the name and path (location) of the document and inserts the name and path into screen 310C. The present method copies the document and provides links to the same in the catalog being produced. The present method will place a copy of this document in any catalog produced by the present method. In one embodiment, the document in the catalog is viewable only when selected by a user.

When the enter company information step 210 has received the necessary data from the user, e.g., appropriate fields 321-329 are complete, then the continue button 357 on screen 310A (FIG. 3A) is selected. Selecting button 357 causes the method to store the company information entered into fields 321-329 and, if any, the company logo graphic 352 for use in the catalog to be produced according to the teachings of the present invention. Accordingly, the present method provides a simple means for a novice with regard to catalog creation to enter pertinent company information and a company logo, which will be used in the catalogs produced by the present method.

Figure 4A:
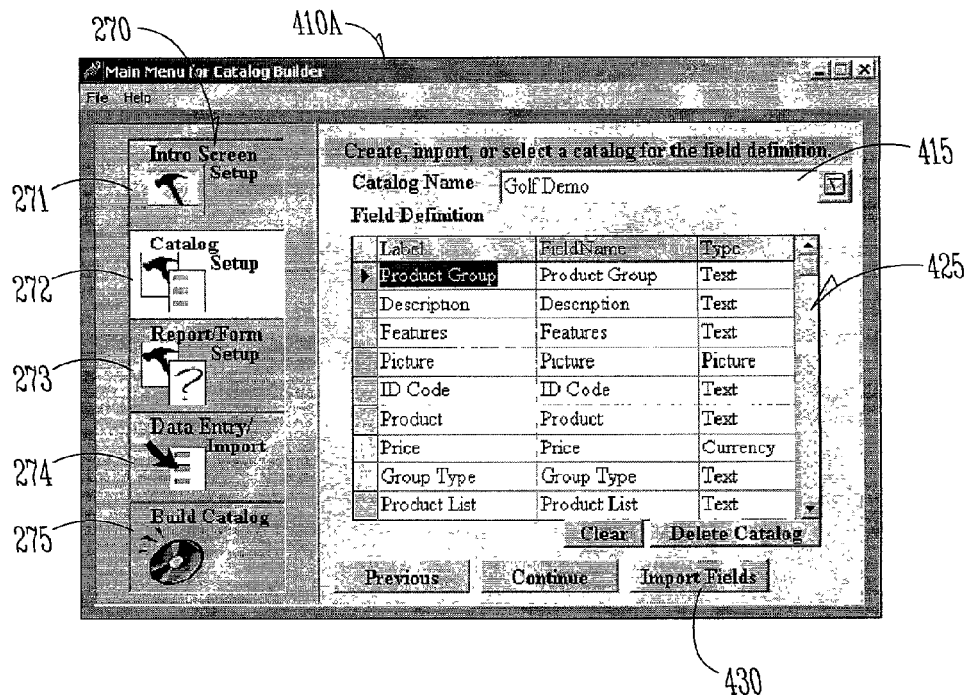
FIGS. 4A-4C are images of catalog setup computer screens according to the teachings of the present invention.

FIG. 4A shows a computer screen 410A in which a user sets up fields, which are used to set up records in a catalog (step 230 as shown in FIG. 2). The present method provides the user with the ability to manually enter the fields for the catalog or import the fields from the existing company database 110. Screen 410A includes a pull-down menu, input field 415. The user inputs a catalog name or uses the pull-down list to select a previous catalog name. A previous catalog name is typically selected when the catalog will be updated with new data from database 110. Step 230 uses the catalog name in input field 415 to determine the database fields that are in the company's previously created database 110, which database fields the present method will use to retrieve data from database 110 to create catalog database 152. If a new catalog is being created, the user types the name of the catalog into field 415. Screen 410A shows the catalog name "Golf Demo" in field 415 as an example. The "Golf Demo" catalog name was previously used to create a catalog according to the teachings of the present invention, so defined fields are displayed in the field definition window 425. The label or name, fieldname (as defined in the company's database 110) and data type are displayed in window 425. The label is a name used by the creator of the catalog database to easily identify the fields in a record. Moreover, the labels are used in the catalog to identify the respective fields in the catalog, where the catalog is in a print or electronic version. For example, the label is an idiomatic English term or phrase, such as product number. The fieldname is the name used in the company database, which may not be as descriptive or recognizable as the label or may be the same as the label. The type is the type of data in the datafield, e.g., text, numerical, or currency. An example of a fieldname that corresponds to a product number is "p#", a programming shorthand for product number. The present invention further supplies special field types such as price range and bar code. These field types allow a customer to search a price range or by a bar code. The bar code field allows data to be input automatically using a bar code reader. For example, the catalog would be published with bar codes. The customer would then scan the bar code to enter data related to that product into a purchase order. Returning now to an example of the field set up, if "Golf Demo" catalog was a new catalog, then all of the fields in field definition window 425 would be blank. The field's label, fieldname and data type may be entered into window 425 manually. Once a catalog name is used and fields are associated with it, then the present method stores the catalog name in the pull-down list and stores the fields linked with the catalog name.

Figure 4B:
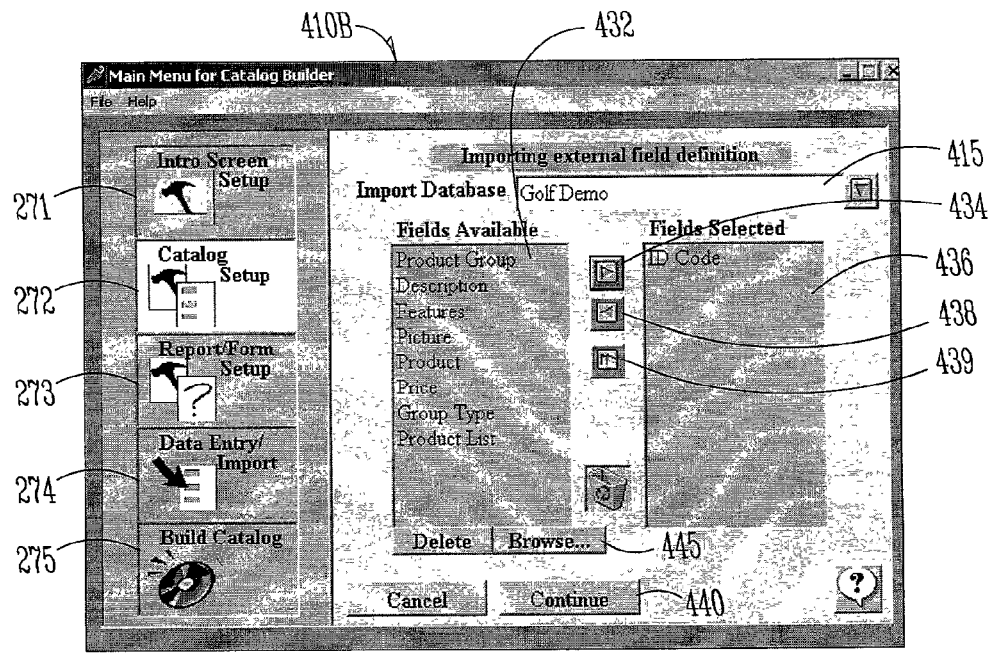

If the catalog name input into field 415 is new or has no fields linked to it, then the present method provides the user with an automated, user-friendly means for acquiring the database fields. The import fields button 430 is selected and the present method displays screen 410B as shown in FIG. 4B. When screen 410B is displayed the user has the option of selecting available fields listed in the fields available window 432 by simply highlighting the desired field and pressing the right arrow button 434. In the example shown in FIG. 4B, the field ID Code was selected and is now listed in the fields selected window 436. If a mistake is made and a field is listed in the fields selected window 436 and it should not be, then the mistaken field is highlighted and left arrow button 438 is pressed. The mistaken field is removed from the fields selected window 436 and placed in the fields available window 432. If button 439 is pressed, then all fields in the fields available window 432 are moved to the fields selected window 438. Once the needed fields that will form the catalog database 152 are placed in the fields selected window 436, then the continue button 440 is pressed. The present method now has a framework of fields which are available in the catalog database 152 and are in the database 110. This framework of fields is created by a graphical user interface shown in FIG. 4B that allows the user to select fields for the catalog database without performing any programming operations other than "selecting" the field and "clicking" the appropriate arrow buttons. No extensive knowledge of database programming is required.

If it is unknown what the fields should be in the fields available window, for example, when a new import database 110 is being used, then the user can press the browse button 445. The present method then opens up an open file prompt window, for example, the open window used by Microsoft Windows that prompts the user for the path to the database 110 and provides graphical user interface tools. Users of widely disseminated computer programs are familiar with such an open file prompt window. Accordingly, it is understood by one of ordinary skill in the art and further description is not required. Once the database is selected, for example through the use of the open file prompt window, the present method scans the database for field names. In the case of a Microsoft Access database 110, the present method then displays the tables in the database 110 in a new window 450 (FIG. 4C) that overlies screen 410B. The user selects one of the tables listed in window 450, here the "GolfDemo" table is selected, and presses the continue button 452. The present method will scan the "GolfDemo" table and extract the fields from the table. The extracted fields are listed in the fields available window 432 of screen 410B (FIG. 4B). The user now selects fields from the fields available window 432 as described above using the graphical user interface.

It should be emphasized at this point that the user does not need extensive knowledge of databases or database programming in order to perform steps 210 and 220. The user needs to know basic company information and the location of the company database 110 in order to create the outline of the catalog. The use of automated inquiry by the present method into the database 110 determines what fields are available, which removes the need to teach the user about the structure of database 110. The user may also remove the fields that are present in the company's database which are not needed for the catalog.

FIG. 5A shows a computer screen 510A in which a user sets up the catalog browser form (step 230 as shown in FIG. 2) for the catalog browser module 167. The catalog browser 167 provides a search engine for the catalog, when stored in an electronic or other machine readable formats. All of the fields selected in step 220, which form the catalog fields, are displayed in a browser fields selected window 501. If it is desired to remove a field from the catalog browser, it is highlighted and removed by pressing left arrow button 502. The deselected field moves to the fields available window 503. If it is desired to move a deselected field from the fields available window 503 to fields selected window 501, then the field is highlighted and the right arrow button 504 is pressed. The highlighted field moves to fields selected window 501. The selected fields in window 501 will be searchable fields by the catalog browser 167 for the current catalog. Thus, the browser 167 and catalog 166 are linked together. Once the necessary fields are on the fields selected window 501, the user presses the continue button 505 and the present method proceeds to the data entry/import step 240. The selected fields in window 501 are the fields that are accessible in the catalog that is produced according to the present invention. Any field that is present in the database but not in the selected field window 501 is not accessible in the catalog using the catalog browser. In an embodiment, the non-selected data is not imported from the database to the catalog. Accordingly, sensitive information that is in the database, such as tiered customer pricing, cost, special discounts, etc., is hidden from the customer that will use the catalog produced according to the present invention.

FIG. 5A also shows a setup button 506. A user presses the setup button 560 and the present method opens window 507 shown in FIG. 5B. Window 507 lists a plurality of modules for interacting with the catalog database for searching, viewing and producing catalogs from the catalog database 152. The listed modules are a browser form 511, a browser icon form 512, browser reports 513, and catalog reports 514. Each of these options defines a way for the user to interact with the catalog after the catalog database is created.

Pressing browser form button 511 moves the present method to a browser editor module. FIG. 5C shows one embodiment of catalog browser editor screen 510C, which defines the user interface for the catalog browser 167 that allows the user to search the catalog database and produce catalog 169 or mini-catalog 164. Screen 510C shows a completed catalog browser including a background image of a golf course hole. A plurality of input boxes 515-519 are shown on screen 510C. The input boxes 515-519 are formed to receive search criteria from a user when the browser is used to search the catalog database. Input boxes 515 and 516 are both text input boxes which receive alphanumeric characters. The input boxes 515-516 each include a caption which indicates which data field in the catalog database it searches. For example, box 516 searches the "description" field. A text input box, in one embodiment of the invention, is created by clicking on the text input drop icon 521 and then clicking the cursor at the location on screen 510C where the text input box should be placed. The user then types in label caption into label caption input field 522 and the catalog data field which corresponds to the text input box is typed into data field input field 523. Catalog browser editor displays the corresponding data field, which was typed in the data field input field 523 in the text input box. Input box 517 is a range field and how it is created is discussed in greater detail below. Input boxes 518 and 519 are list input boxes, which are created by clicking list input icon 524 and thereafter clicking the location on screen 510C where the list input box should appear. Like the text input boxes, the label caption and corresponding catalog data fields are typed into fields 522 and 523, respectively. Icon 525 allows the user to insert a text box, e.g., company name box 526, with the text appearing in the text box being typed into label caption field 522. Icon 527 saves the current browser as shown in screen 510C as the browser for the present catalog. These functions are also accessible via the menu bar under the tools menu.

Pressing field list icon 530 opens a field list window 510D. In field list window 510D are a database folder 531 and a company folder 532. The database folder 531 displays all of the selected catalog database fields as determined in step 220. The database folder 531 further includes indicators of the type of input box which is to be added to the catalog browser as shown on screen 510C. Database folder 531 includes text box, list box, and range field types. The user first selects the desired input box type, here the text box type is selected as shown on screen 510D. The user now merely selects the data field to add to the catalog browser and drags and drops same at the location for same on screen 510C. Thus, the user uses a simple select, drag and drop to create and position input boxes on screen 510C. For example to create a product group text input box for searching the catalog, the user positions the cursor on the name product group in the database folder 531 selects same, e.g., by click and holding a mouse button, and then drags cursor to a select input text box position on screen 510C and drops, e.g., releases mouse button, the product group name on screen 510C. The present method creates the box, inputs the label caption and inputs the data field for the product group text input box. The user can edit the label caption by selecting the input box on screen 510C and using the label caption field 522.

Company information can also be dragged and dropped from window 510D to screen 510C. The company information is the same as the company information fields of step 210. The company folder 532 is selected in window 510D. The user selects the company information to add to the catalog browser, drags the selected company information to a select position on screen 510C and drops the information on screen 510C. The present methods adds the dropped company information as a text only and does not link same to any catalog data fields. Thus, the user can add both searching input boxes and company information to the browser without programming or macro defining sets. The present method performs the required programming based on the drag and drop action from window 510D to screen 510C.

Pressing button 512 of window 507 (FIG. 5B) moves the method to a setup browser result icon module. FIG. 5E shows screen 510E which allows a user to set up a picture oriented catalog, which is especially useful for jewelry, art, and clothing catalogs. Each picture oriented catalog can display top descriptor, a picture and a bottom descriptor. This is determined by the template for the picture oriented catalog as stored in the catalog builder module. In an embodiment, screen 510E includes a pull-down list of all of the fields in the catalog database as setup in step 220. Thus, the user opens pull down list 535 for the top descriptor and selects the catalog database field for the top descriptor. The top descriptor will appear above a corresponding picture in the picture oriented catalog. The user then opens pull down list 536 for the picture and selects the catalog database field for the picture. The user opens pull down list 537 for the bottom descriptor and selects the catalog database field for the bottom descriptor. The bottom descriptor will appear below a corresponding picture in the picture oriented catalog. If either the top or bottom descriptors are blank, then nothing will appear in their location near the picture. A test information section 538 is included on screen 510E. Section 538 sets the size of each display in the picture-oriented catalog. In one embodiment, section 538 only governs the size of the picture. In another embodiment the section governs the size of the picture and at least one of the top descriptor and the bottom descriptor. Once the fields and size of the display in the catalog are set, the user presses continue button and the present method stores the browser icon form for picture oriented catalogs. In an embodiment, an array of the available icons or pictures is displayed. The user selects the first icon to be displayed in the catalog. The user thereafter selects, in order, subsequent icons to be displayed in the catalog. The text associated with each icon is pulled from the database. Thus, a graphically oriented catalog is setup.

Pressing button 513 on window 507 (FIG. 5B) moves the present method to a setup reports and forms module. FIG. 5F shows a screen 510F which determines which catalog database fields from step 220 are linked to specific fields in a catalog template, report or form, e.g., a purchase order. The first report field 541 is for a purchase order and is used in conjunction with the shopping cart feature disclosed herein. Report field includes, from left to right, a quantity sub-field 542, which indicates how many of any item in the purchase order the user wishes to purchase and has a default value of one. Item ID sub-field 543 is designed to store an identification number for a product, e.g., SKU, PLU, etc. The user opens the pull down menu below the item ID sub-field 543 to select which of the catalog database fields is linked to the item ID field. Each of the pull down menus on screen 510F include all of the catalog database fields selected in step 220. The selected catalog database field for the item ID sub-field is displayed in bold below the caption of sub-field 543. This process is repeated for each of the item name sub-field 544, description sub-field 545, and item price sub-field 546. The purchase order form displays the listed catalog database fields in the same left to right order as shown in field 541. Report grouping field 548 operates in a substantially similar manner as field 541 except the field 548 determines the order of reports and catalog documents instead of purchase orders. A check box 549 is provided and when checked, fields without a value stored therein, e.g., a null value for a text field or a zero value for a numeric field, are not displayed even when they are selected in one of fields 541 or 548.

Pressing catalog reports button 514 of window 507 (FIG. 5B) moves the method to a catalog report or template setup module. FIG. 5G-5I show the operation of the catalog report setup module. FIG. 5G shows screen 510G which includes a sample image 551 and has a select a report pull down menu 552. Menu 552 includes a single item picture and a multi item picture choices. FIG. 5H shows a screen 510H that results from selecting the multi item picture choice. Category selection fields 553-557 are provided which organize the catalog data fields into a hierarchy. Each field includes a pull down list that includes all of the catalog database fields as determined in step 220. The user can open the pull down list in primary category field 553 and scroll through the list of catalog data fields until the primary catalog data field is selected. This selected catalog data field is the first catalog record sorting criteria for the catalog. The same method is used to determine the remaining hierarchy of the categories 554-557. If a category is left blank, e.g., fourth and fifth categories of screen 510H, then the records for the catalog are ordered in a first encountered, first listed format. Icons or images can be attached at the category level of the catalog such that each item in a catalog does not require an image. The icon check box 558 is checked aligned with the third category. Thus, images are attached to the third category of like records in the catalog database. An indicator 559 is positioned adjacent the third category caption to further graphically indicate the third category has the images attached thereto. The present catalog output further includes the option of numbering the different groups according to different values in a select category. As shown in FIG. 5H, the group check box 561 aligned with the second category is checked accordingly the second category in an output catalog created by the present method is numbered according to each different value in the second category. Graphical indicators 562 are positioned adjacent the second category field to graphically indicate which category, if any are being numbered by groups.

Screen 510H further includes a detail section folder 564. Detail section folder 564 determines which catalog database fields are displayed in detail. That is the catalog database fields listed in detail section 564, here ID Code, Product, Price, and Description, have the values stored therein output in a catalog or mini-catalog. An example is shown in FIGS. 9A and 9B and discussed below.

Screen 510H further includes an auto fields folder 566 as shown in FIG. 5I. The auto fields folder 566 allows the user to select from the fields available list 567 and using the right pointer button 568 shift the selected field to a field detail list 569. In the embodiment shown in FIG. 5I, field detail list is currently empty. Selected fields can be removed from fields available list 569 by pressing left pointer button 570. The auto fields folder 566 further includes check circles 571 for choosing whether to ignore, i.e., not output, data fields which are selected but have a null value or datafields which are selected but have a null or zero value. Thus, a graphical user interface is provided which presents the catalog database fields to the user in either a pull down list form or a sift to select form.

FIG. 5J shows a screen 510J which appears after the font/color button 573 is pressed. The font/size/color screen 510J provides the user with a graphical display of the current layout of a catalog output from the present method. FIGS. 9A and 9B show this layout with the golf demo data. The user can change the fonts, size of sections and the colors for each of the sections of the catalog. For example using screen 510J, the user can change the color scheme, font and size of each of the categories 553-557. The user can also change the color scheme, font and size of the header and footer in screen 510J. This helps the user by compartmentalizing the tasks. The prior screen determined the hierarchy of the catalog data base fields, screen 510J only concerns itself with a few design choices like font, size and color.

FIG. 5K shows a screen 510K displayed by the present method when the single item picture is chosen in field 522. Each product has a picture in this type of catalog output. Screen 510K shows the layout of this type of catalog and has a plurality of pull down lists 581-587. The pull down menus determine the location of each catalog data field that will be displayed next to each picture.

FIG. 5L shows a screen 510L displayed by the present method for setting a report template that, in an embodiment, after the button 514 is selected. Screen 510L shows a selection box 591 that selects which style of report template is being programmed. As shown, picture detail is select in box 591. A plurality of user input boxes 592 are shown below box 591. These include section layout, which allows the user to set page breaks, hide certain categories or sections, and set other catalog settings. The category sequence box determines the order that the categories are displayed in a report or catalog. The picture box, at bottom left of screen 510L, sets the height and width of header and detail pictures. The detail lines box allows the user to set the types of lines used in the report or catalog. The documents box sets the page breaks and types of documents that cannot be imported into the report. A tabs box allows the user to place tabs in the margins of the report or catalog. Thus, a visual indicator tab that has a distinct color for a specified category of items is added to the report. Such a visual indicator provides the end user or customer using the report a reference device for quickly finding classes of items in the catalog.

FIG. 6A shows a computer screen 610A in which a user enters data or imports data from the database 120 (step 240 as shown in FIG. 2). Screen 610A includes a catalog information window 605, which informs the user of the catalog name which was previously entered in screen 410A (FIG. 4A) and the catalog path which is the location where the catalog will be saved. The user may manually enter data by pressing data entry button 615. The present invention may also non-manually import the data for the catalog directly from the database 110 to increase efficiency and accuracy of the catalog database being produced. The user presses import data button 620 to begin the automatic import process. FIG. 6B shows a screen 610B that, after pressing the import data button 620, informs a user that he is about to re-import data from the company's database. This provides users with an opportunity to stop the import process if it is desired to keep the previous catalog data. If the user selects "no," then the program according to the teachings of the present method returns to screen 610A. At this time the user may decide to return to the previous screens by pressing the previous button, and give this catalog a unique name and create a new catalog which will not delete the previously imported data. If the user selects "yes," the program deletes the previously imported data for this particular catalog name and imports new data. The present method goes to the database 110, which was used to import the fields in step 220 (FIGS. 4A-4C), to import data from the selected fields in the company's database. The present method already has created a record template that includes the selected fields from step 220. Now the method reads the data from each record in database 110 and creates a new record in the format selected for the catalog database 152. The imported data is stored in database 152. Once the data is imported and stored, the user presses the continue button to go to the build catalog step 250.

Figure 4C:
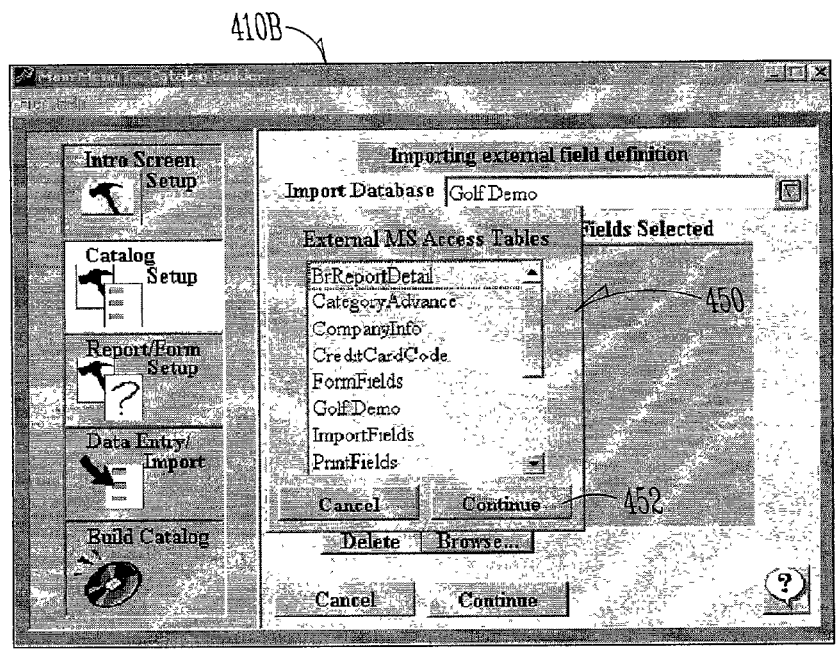

If data entry button 615 is pressed, then the present method opens a new window 610C (FIG. 6C), in which the user may manually enter the data corresponding to the fields defined in step 220 (FIGS. 4A-4C). The user types in data into the input windows adjacent the labels that correspond to each data field. Each set of data fields is one record. The user may add additional records which contain data for different products. However, some products will overlap with regard to certain categories. For example, FIG. 6C shows a product group of golf clubs. There are numerous golf club manufactures, e.g., Titleist™, Calloway™, Ping™, etc. Clubs having different manufacturers would still have the product group of golf clubs but would have different data in other fields. Moreover, records may have only one data field which is different from the other data fields. The present method will use these data fields to organize and create the catalog 167.

FIG. 6C shows a screen 610C, which is displayed after the user presses the data entry button 615, that allows the user to manually enter data into the fields. The fields are the same as those defined in the catalog database field setup step 230. Screen 610C shows a record in the Golf Demo example catalog and the user may edit the data in the fields of the record displayed. The user may edit the data in this field using an input device such as the keyboard and/or the mouse. The present method presents one input box 631-638 that respectively corresponds to the product group field, group type field, product list field, description field, features field, ID code field, product field, and price field. Each of these fields is a text or numerical field as defined in the catalog setup step 220, see FIG. 4A, and thus the input boxes receive keyboard and/or mouse input to insert and/or edit the data into the proper field.

Screen 610C includes a plurality of function buttons for manipulating the data in the catalog database. An add button 641 allows the user to add a new record to the catalog database. The new record will include all of the fields defined in the catalog setup step 220. The new record will appear in screen 610C and the user will enter the data for the new record into input boxes 631-638. Delete button 642 allows a user to delete the record that is currently displayed in screen 610C. Copy button 643 copies the present record into a new record. Update button 644 saves the current record to the catalog database so that any edits are stored in the catalog database 152 before proceeding. Search button 645 allows the user to search any of the catalog defined fields. The user can thus search the catalog database for a specific record to display in screen 610C and on which the user can perform the functions of the enter information step. The picture button 646 displays the picture associated with the present record. The advance button 647 allows the user to perform advanced definition functions on the categories and organization of the catalog. Such advance functions allow the user to attach images, memo, text or document to a product category.

Pressing advance button 647 opens screen 610D as shown in FIG. 6D. The advance function provides the user with a graphical interface in which the layout of the catalog is determined. Screen 610D displays the layout of the categories as previously defined in the setup step 230 and discussed in conjunction with FIG. 5. The layout of categories includes pull-down lists of each group of data in the categories. That is, the primary category includes a list of distinct data from the data field identified as the primary category in step 230. The second category includes a list of distinct data from the data field identified as the second category in step 230. The third category includes a list of distinct data from the data field identified as the third category in step 230. Thus, the user can select which category he desires to perform advanced functions on by selecting the specific set of record using the pull-down menus. The user need not know, and in the case of extremely large catalogs having thousands of records may be impossible to remember, all of the records which include data in any of the primary, second and third categories. Screen 610D further displays a group icon 657 that represents which group the second category belongs to and picture icon 658 which represents which category the pictures will be attached to. Once a category is selected, here shown as a primary category of golf clubs, a second category of Calloway, and a third category of drivers, the user may perform the advance functions on the records having the same data in the corresponding data fields. The advance functions include imbedding memos and documents into the catalog for select categories of records. Adjacent the lowest category level, here the third level as shown in FIG. 6D, are buttons for creating a memo 651 or attaching a document 652. The memo button 651 allows the user to enter a short memo about the products represented by the lowest level category which will be in the catalog. The present method links this memo to the records in the catalog database 152 having the same primary, second and third categories as those displayed on screen 610D. This memo is displayed in the exported version of the catalog. The document attach button 652 links a document to the records in the catalog database having the same primary, second and third categories as those displayed in screen 610D. This is particularly useful for attaching specification sheets or material safety data sheets to the products in the catalog. A salesperson with the catalog produced according to the present invention thus can have all of the specification sheets and material safety data sheets at their disposal without having to keep a hard copy on hand or order same to send to a potential customer. All of these documents for each product may be electronically stored in the catalog database 152 and only produced (printed or an electronic image) when needed.

Screen 610D further includes a header/footer button that allows the user to define the types of headers, footers, and/or page numbers to be used in the catalog. This allows the user to customize the appearance of the catalog. The header or footer may be entered by the user at this time or may be data previously entered, e.g. company information.

The records in the Golf Demo example catalog further include a picture field that associates an image with each individual product having a record in the catalog database. This picture field does not have an input box as shown in FIG. 6C. The user may selectively attach pictures to certain product records using a display menu 661 as shown in screens 610C-610D. Opening the display menu 661 allows the user to display the current picture attached to the category currently shown in either screen 610C or 610D. The picture attached to the record can be inserted, deleted and/or replace by using a graphical user interface and searching through the computer's directory for the filename of the picture to attach. This allows the user to attach an image, which resides in the computer, network, or database 110, to individual records in the catalog database 152.

FIG. 6F shows an alternate product or item input screen 610F. Screen 610F shows a grid or spreadsheet of numerous items at once. Thus, data can be imported from a database into the input grid. By selecting a box in the grid, data can be updated. Images can be attached to one or a plurality of boxes in the grid by selecting the box(es) that will be associated with the image. The same produce is used to link text data, e.g., spec sheets, MSDS, standards, etc., to a group of items.

FIG. 7A shows a computer screen 710A in which a user builds the catalog from the entered and imported data (step 250 as shown in FIG. 2). Computer screen 710A provides the user with the option of pressing the continue button 715, doing so causes the method according to the present invention to access the company database 110 and retrieve data stored therein corresponding to the fields selected in the catalog setup step 220. The method builds the retrieved data into records which are stored in the catalog database 152 in electronic form. The electronic form includes, but is not limited to, a fixed image such as the PDF file format and an electronic database which is ODBC compliant. Screen 710A includes a catalog export button 725 and a catalog browser button 730, which respectively link the catalog build step 250 with catalog export module 161 and catalog browser 167.

FIG. 7B shows a computer screen 710B showing an embodiment of the present method to create a CD image of the catalog. By clicking the check circle 751 adjacent the CD ROM indicator, screen 710B displays a catalog name field, a build path field, and an enable Sub Catalog for CD image field. The user enters the build path, which locates the directory of the catalog database 152 and the catalog builder module 151.

Figure 11A:
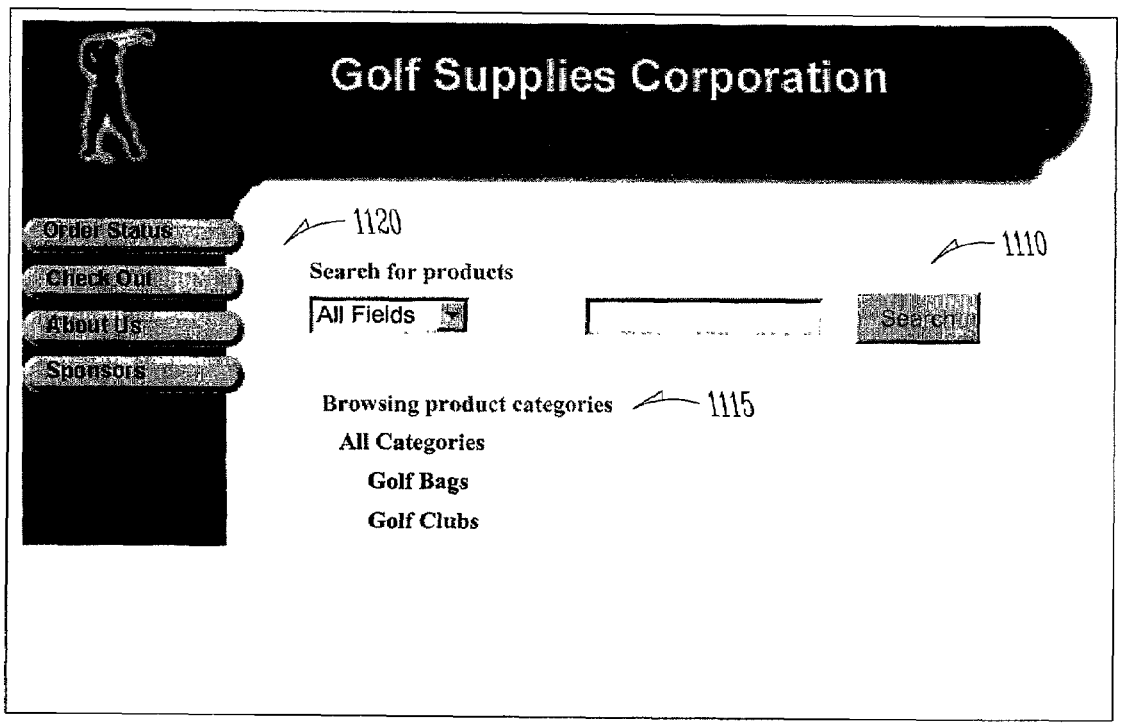
FIGS. 11A and 11B are images (printouts) of a dynamic web page created according to the present invention.

FIG. 7C shows a computer screen 710C similar to screen 710B except that computer screen 710C represents an embodiment of the present method to create a dynamic web page. By clicking the check circle 751 adjacent the web page indicator 752, screen 710C displays a web build path field 754, a web server home path 756, and the type of web page field 758. The user enters the web build path, which locates the directory of the catalog database 152 and the catalog builder module 151, into field 754. The user further enters the location of the web server hosting the web page in field 756. The user can use the browse buttons to locate the correct paths. Here the web page is built on the C drive and can be simply copied to the web server. The type of web page is selected from a pull down list. Here express web catalog is chosen. When the build button 715 is pressed, the method builds a dynamic web page as shown in FIG. 11A. The web page 11A only displays part of the catalog, here the golf demo catalog. The web page includes a plurality of links therein and when one is selected the web page queries the catalog database for information connected to the link. Based on the response to the query the web page is updated. For example, in FIG. 11A the golf clubs link is selected. The web page queries catalog database for golf clubs. The database responds with the list of types shown in FIG. 11B. Accordingly, the web site is not rigidly encoded html but can change when the data in catalog database changes. Moreover, the web page is smaller as it does not contain an entire catalog at one time.

The catalog export and catalog browser buttons are in the preview button in FIGS. 7B and 7C.

Figure 8A:
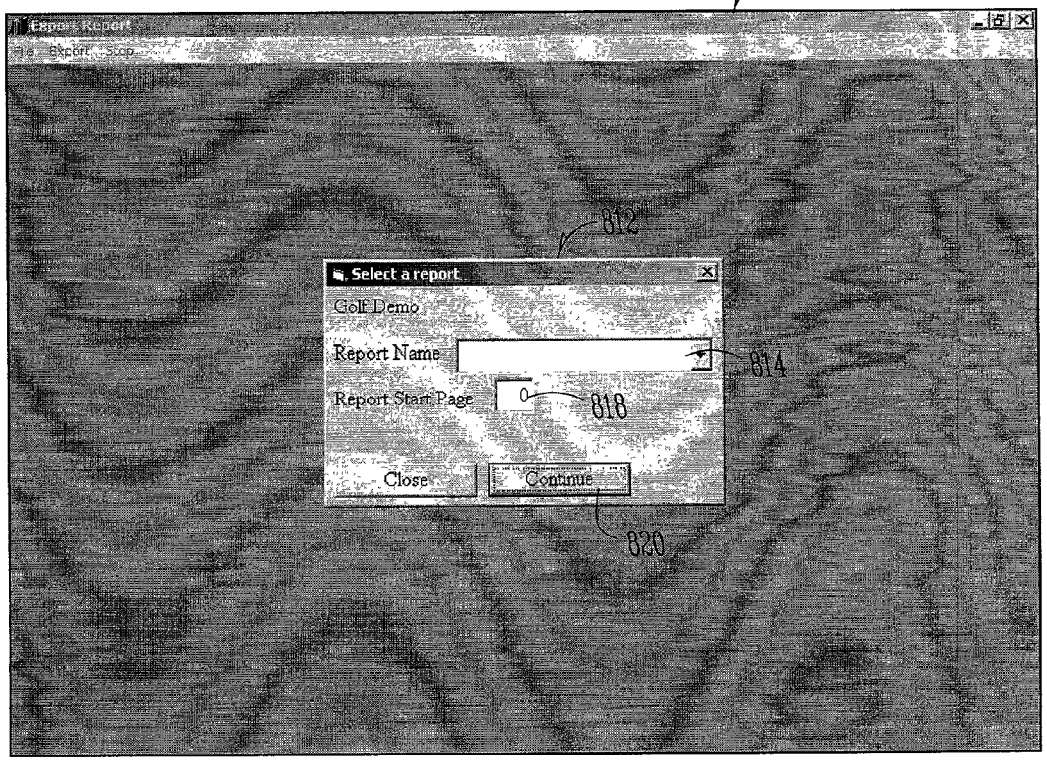
FIGS. 8A and 8B are images of catalog export computer screens according to the teachings of the present invention.
Figure 8B:
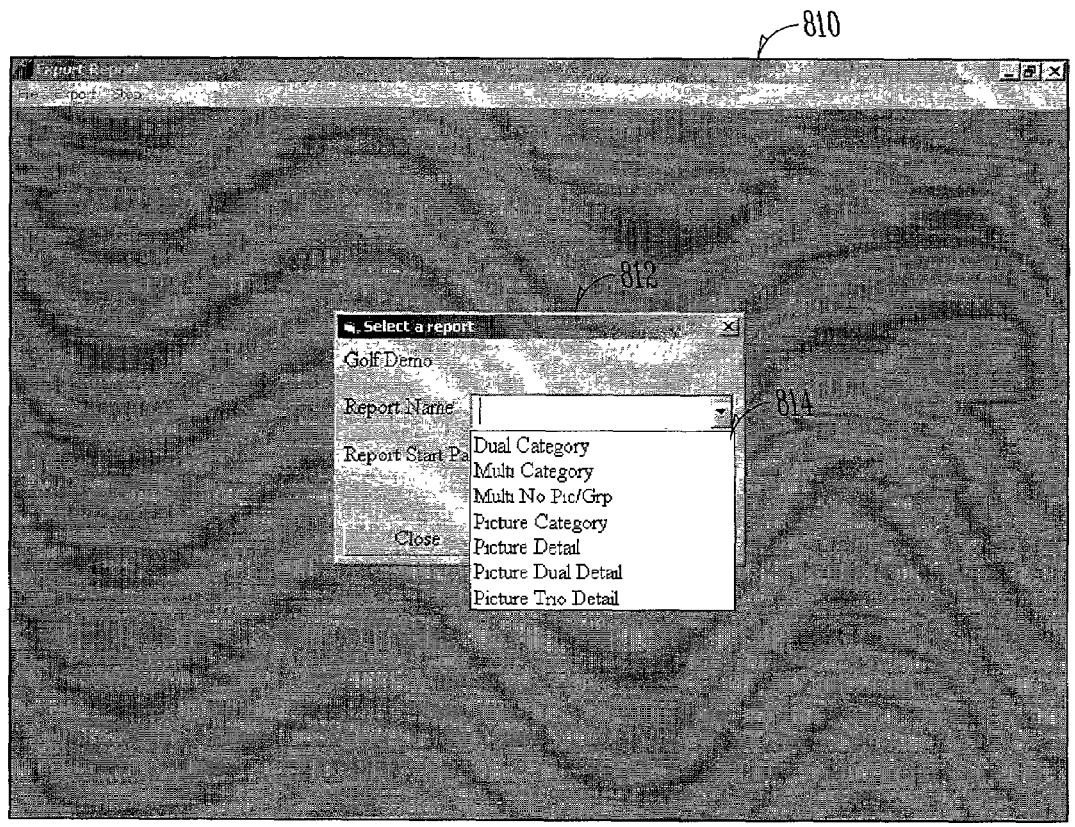

Pressing the catalog export button 725 causes the present method to activate the catalog export module 161 and begin a catalog export routine. FIG. 8A shows a screen 810 produced by one embodiment of catalog export module 161. A window 812 opens and prompts the user for the type of report to be generated. The window 812 includes the name of the catalog, here "Golf Demo" and includes a report name, drop down input field 814 for the type of report to create. FIG. 8B shows the template choices available for the input field 814. These template choices represent formats for a catalog which are programmed into the software of the present invention. These templates are standard catalog layouts, such as dual category, multi-category, multi-category with no picture/group, picture category, picture detail, picture dual column detail, picture tri-column detail. The formats with the term picture in the name include pictures. The formats with the term detail include all of the data available but no null or empty data fields. The formats also include single, dual and three column formats. After the report name is input into input field 814, then the user can select the report start page in input field 818. Once input fields 814, 818 are complete, then the continue button 820 is pressed and the report 162 is generated.

The method according to the present invention now produces a catalog based on the selected template in field 814. FIGS. 9A-9B show pages of a two-page, demo catalog produced from the Golf Demo catalog database as built by steps 210-250. The user merely selected the template for the report, here the "picture detail" template, and presses the continue button. The method formats the data in the catalog database to fit the "picture detail" report template. That is the catalog shown in FIGS. 9A-9B includes a header including company name, company phone number and company fax number as entered in step 210 and setup using button 653 as shown in FIG. 6D. Any catalog produced from the Golf Demo catalog database will have the same header. The footer setup using button 653 appears on each page of the FIGS. 9A-9B catalog. The catalog is thus produced according to the report form setup step 230. No other action was taken by the user to produce the report, which is visible on the computer screen. The present method also automatically creates a table of contents (FIG. 9C) and an index (FIG. 9D). The export routine tracks the page of each group type, here golf clubs, each product group, here manufacturer name, and each product, here club type, to produce the table of contents as shown in FIG. 9C. An alphabetized index of products is also produced including the page number where the individual products can be found. While in such a small exported catalog as one shown in FIGS. 9A-9B may not need the table of contents and index, a large catalog of thousands or millions of products requires an accurate table of contents and index.

Moreover, the present method dynamically re-creates the table of content and index for each report generated. Thus, if certain products are removed from the catalog or removed from a specific report, then the table of contents and index are recreated to automatically reflect the changes in the products listed in the report. Thus, in one embodiment of the invention, the table of contents and index are automatically generated for each report and a manual creation of same is not required.

Catalog export module 161 creates the catalog and allows the user to select the type of output. Types of output include, but are not limited to, PDF format, hard copy printouts, electronic formats such as rtf, and facsimile formats. Thus, catalog export module 161 provides the user with all of the tools to provide a customer or user of the catalog with any possible format readily for dissemination in hard copy and multiple electronic formats.

Catalog export module 161 further allows the user to select which fields will appear in the output. For example, if the price information should not be included in the report, the user removes this field from those selected for the report. Module 161 creates a new catalog without the price information.

Figures 10A, 10B:
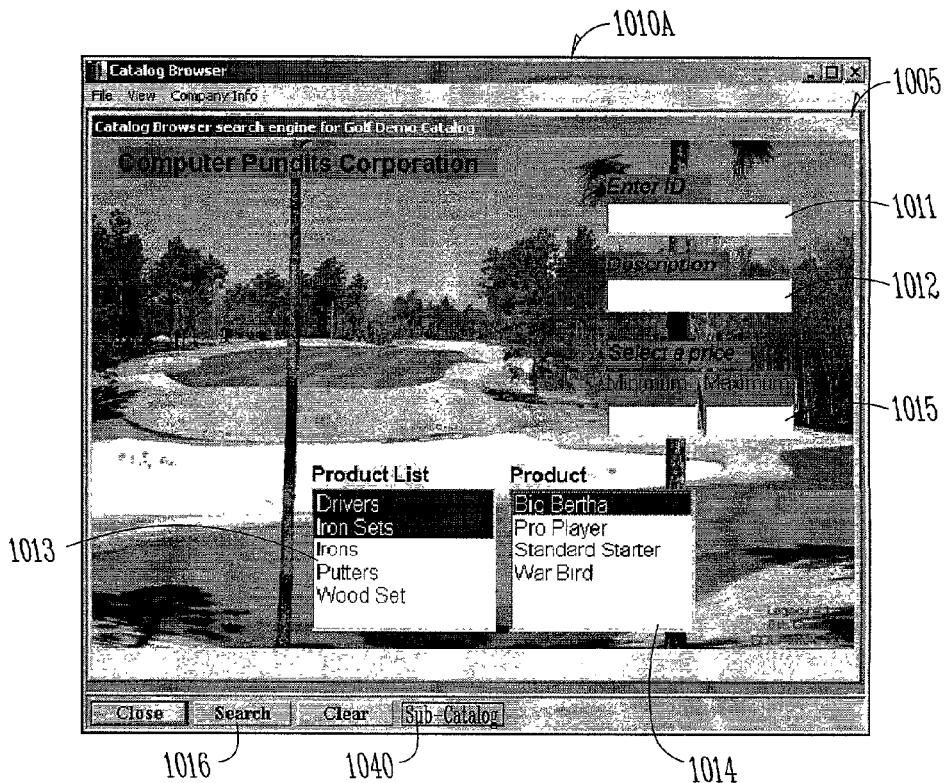
FIGS. 10A-10D are images of a catalog browser computer screen according to the teachings of the present invention.

FIG. 10A shows a catalog browser interface 1005 on a computer screen 1010A for the searching and browsing the catalog produced according to the present invention. The browser 1005 is defined during the report/form setup step 230, when the user selects which data fields are searchable in the catalog database and without programming or macro creation. The user selects the fields which should be searchable by the browser 1005 and creates input boxes corresponding to the searchable fields. The creation of the boxes was done by a graphical user interface with select and drag and drop capability. The user then uses an editor module to build an interface for the catalog browser module 167. The browser interface 1005 as illustrated in FIG. 10A includes a background image related to the contents of the "Golf Demo" catalog, and a plurality of input boxes 1011-1015. Each input box correspond to one data type and are labeled according to the type of data field in catalog database which it corresponds to. The present example includes an ID Code input box 1011, a description input box 1012, a product list box 1013, a product box 1014, and price range boxes 1015. Price range boxes allows a user to input a maximum price and/or a minimum price as search criteria. In the illustrated example of golf clubs this is useful to filter out cheaper and possibly lower quality clubs and remove clubs which are unaffordable. The price range boxes 1015 are useful in other catalogs as well for similar reasons. The product list box 1013 and product box 1014 are linked and by selecting product types in the product list box, here drivers and iron sets are selected, displays products of the selected product types in the product box 1014, here Big Bertha™, Pro Player™, Standard Starter™, and War Bird™. The Big Bertha product name is selected in the product box 1014. Pressing the search button 1016 causes the browser 167 to retrieve all records from catalog database 152 and display same on screen 1010B. Thus, the browser screen is designed to provide an easy to use graphical user interface that allows the user to search the catalog database according to inputs into input boxes, which correspond to the fields define in catalog report form setup step 230.

Figure 10C:
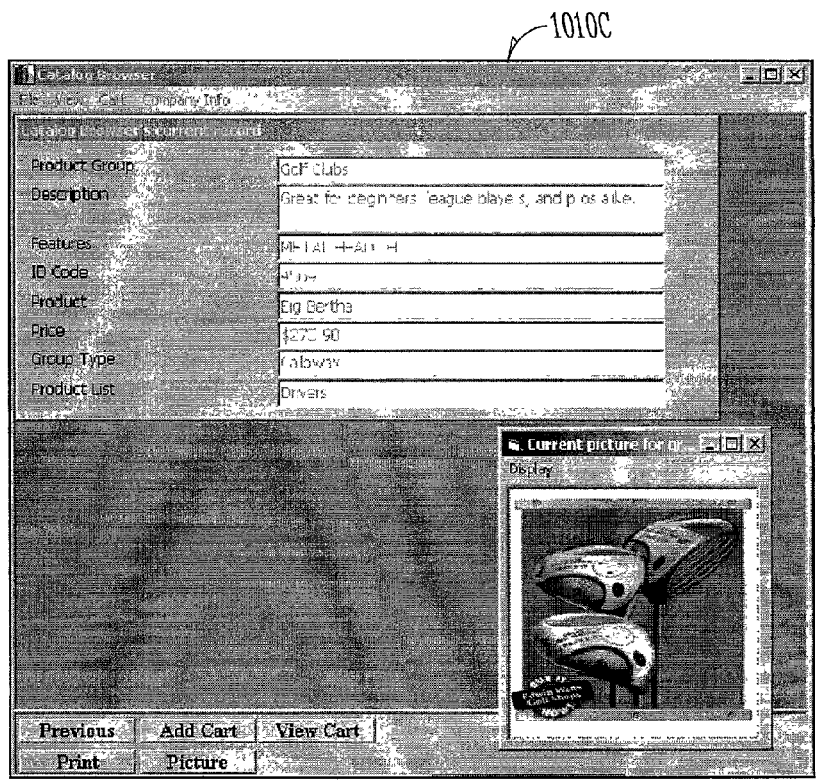
Figure 10D:
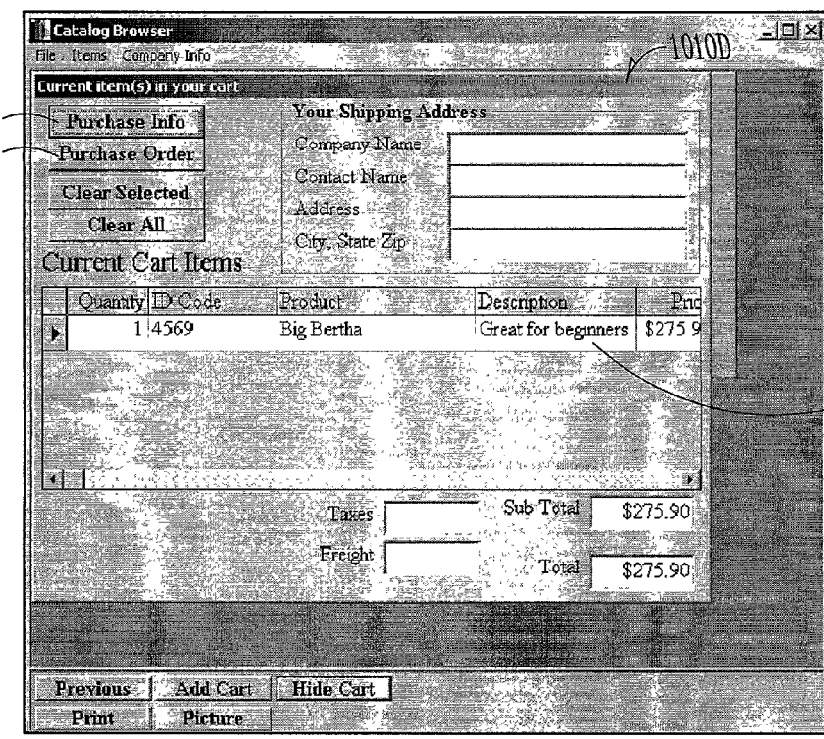

Browser search result screen 1010B graphically provides the user with a plurality of choices of how to manipulate the displayed data. The user can press the previous button 1021 and return to browser screen 1010A to perform another search. The user can press the detail button 1022, which opens up record detail screen 1010C. FIG. 10C shows screen 1010C, which displays all of the data of the selected record of screen 1010B and displays the picture associated with the record, if any. The user can also press report button 1023, which produces a report containing just the records found in the search and displayed on screen 1010B. Such a report can be output in any of the formats described herein, for example, pdf, facsimile, rtf, etc., as selected by the user. The user also has the option of pressing the picture button 1024, which displays the picture associated with the currently selected record on screen 1010B. The user may further press the add cart button 1025, which adds the currently selected record to a virtual shopping cart. The virtual shopping cart is a list of records of products that the user would like to purchase. When the user wishes to see all of the products in the shopping cart, the view cart button 1026 is pressed, which opens screen 1010D as shown in FIG. 10D. Screen 1010D provides a list 1030 of current items in the cart and the entire record of data for that item along with a quantity indication. Screen 1010D also provides a graphical user interface for generating a purchase order by pressing the purchase info button 1031 to add information pertinent to a commercial sale, such as shipping address, billing address, shipping method, tax status, customer id, and special instructions. The user then presses the purchase order button 1032 and the present method imports the data of the items in the shopping cart and merges in purchase information into a purchase order (not shown). The purchase order is displayed, can be edited, and exported in any of the formats supported by the present method, e.g., PDF, facsimile, rtf, etc., as selected by the user. Thus, a purchase order is created without the user having to thumb through a catalog, manually find the correct product, manually copy the relevant data from the catalog, manually enter the relevant data into a purchase order and send same to the company. These steps are handled by the present method in a computer program to reduce the likelihood of typographical errors during creation of the purchase order.

Once the user finds a desired item in the catalog, the user can view, print or prepare a specification sheet that may include material safety data or item data. Thus, the user can access more detailed information about the item. Such information is stored in or linked to the catalog database. Thus, when more detailed information is needed it is easily, instantaneously accessible by the catalog user without the need to search for the specification sheet or contact the company to provide the specification sheet.

In the above computer screens and windows, there are previous buttons and cancel buttons. The previous buttons move the method back to the previous screen or the previous step in the present method. The cancel buttons cancel the action current being performed by the method and returns the method to the previous step or window. The user of the present method having ordinary skill in the art will recognize the use of such buttons, accordingly, a more detailed discussion is not believed to be necessary.

It will further be appreciated that the catalog produced according to the present invention that is stored in electronic or machine-readable formats is dynamically searchable. That is, the catalog is searchable in a plurality of different ways. The search can be performed based on multiple catalog fields, which is a multiple-dimensional search.

The present invention further includes a method and structure that allows the user to create a sub-catalog from the master catalog database. In an embodiment, a sub-catalog button 1040 is displayed on the catalog browser, e.g., screen 1010A. When the user wants to create a sub-catalog, third database button 1040 is selected. This sub-catalog includes the items found in the previous search performed by the catalog search engine. In an embodiment, the user presses the sub-catalog button 1040 and has the option to use the results of the last search to create a sub-catalog or perform another search. The user names the sub-catalog and the name and sub-catalog data are stored in the catalog database. Thus, when the user returns to catalog builder, this sub-catalog is available in the catalog set-up and can be chosen without having to rebuild the catalog. The sub-catalog includes the features of a catalog described herein but it is limited to the sub-group of items and data associated with the items. For example, the data is stored in the catalog database and is updated whenever the catalog builder accesses the company database. For example, FIG. 10A shows a search of Big Bertha™ drivers. A sub-catalog is producible from the results of the search for Big Bertha™ drivers.

Figure 11B:
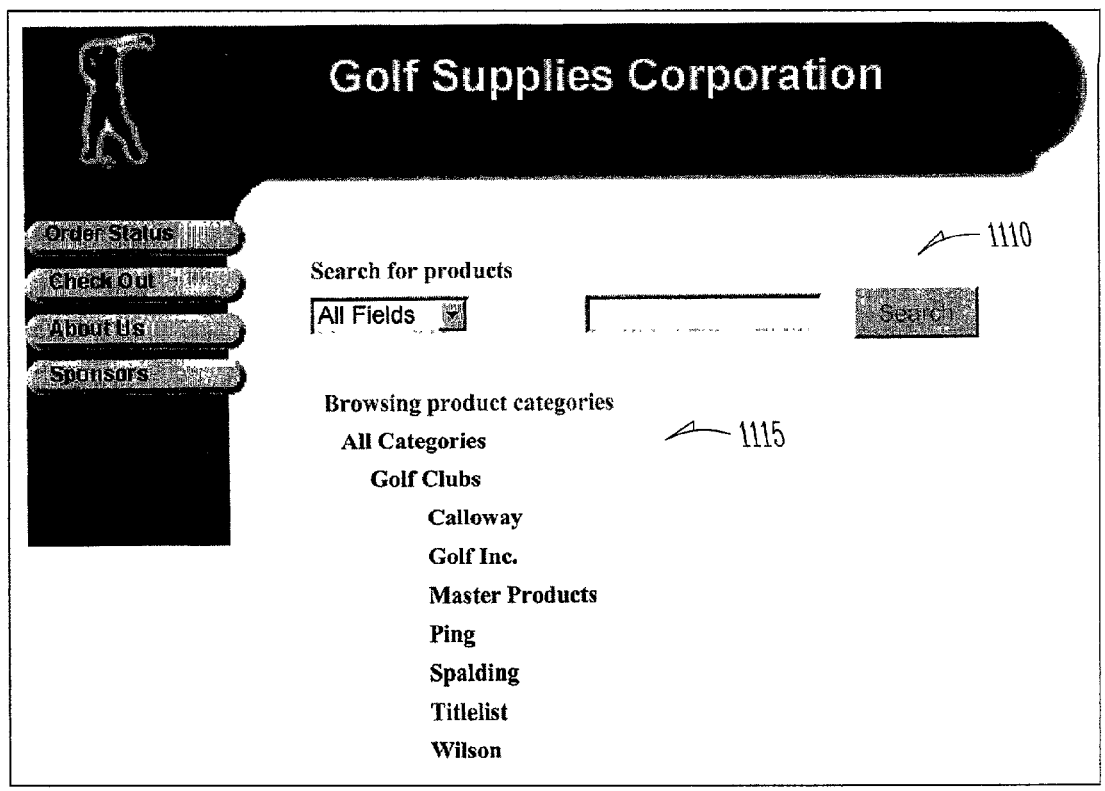

FIGS. 11A-11B show a dynamic web page that displays a catalog according to the present invention. FIG. 11A is an initial web page catalog showing a search interface 1110, a browse by category interface 1115, and other links 1120. The search interface would query the stored catalog database, e.g., database 152, as retrieve and display the results on the web page. The browse by category allows the user to narrow the fields for display. For example, FIG. 11B shows the category golf clubs selected. The dynamic web page queries the catalog and returns the sub-fields under the golf club category. The user can repeat this until a particular item or product is selected, then the dynamic web page will query the catalog database and return specific data with regard to that product.

Figure 12C:

FIGS. 12A-12C show catalog pages for a catalog having a defined hierarchy of categories. The first category is cutting tools. All of the products listed on FIGS. 12A-12C fall under the category of cutting tools. The second category is the type of cutting tool. Here the second categories are drills, end mill-carbide, holders, milling cutter, and taps. The images in this example of a catalog according to the present invention include images associated with the second categories. However, not all of the second categories have images. For example, miller cutter and taps categories do not include displayed images. A third category is a product name. For each product name, the catalog lists a description, part number and price in a table form. The layout of the catalog was chosen by the user. However, wherever a product does not include data in a field of a record in the catalog database 152, the present method does not display that column of data for those products. The present program then imports data from a company database and automatically formats the imported data into the catalog format as shown. The catalog as shown in FIGS. 12A-12C is stored in a machine readable format in an embodiment. In an embodiment, the catalog shown in FIGS. 12A-12C is printed in hard copy for dissemination to potential customers.

The present method and catalog further include the ability to display only data that is associated with a particular item. The company database may include hundreds or thousands of different data fields. An embodiment of the present methods does not import the null fields into the catalog database. Further, the present method and catalog do not display fields that have a null value. For example, FIG. 12A includes three columns of information, namely, description, part number and price, that are associated with the first type of product, namely, an HSS Jobber drill. FIG. 12B shows three different types of products that have at least one column of information that is different from the other types of products. Specifically, the second type of product is an End Mill-Carbide that includes six columns of information including shank size, which the other product types do not include. The present method does not display the shank column for the product types that do not have any data for a shank information or data. FIG. 12C shows a further type of product that has the same fields or columns of information as the first product type. Thus, the present method alters the type of information displayed for each product type based on data fields being a null value for alphabetic values or a zero value for numerical values. Moreover, when each product includes a same data field, e.g., part number, the present method displays the part number in a part number column for all types of products.

CONCLUSION

Thus, systems and methods are described which allow a business or individual to create a catalog using a PC and without special training in graphic design or publishing. Moreover, the present method does not require the user to design each individual page of the catalog. The user defines a set of fields which are to be in the catalog. The present method organizes the fields in a hierarchy input by the user into a stored template. All products are organized by this hierarchy. This provides the user with several benefits. First, a large catalog or database can be divided into sub-catalogs as needed. For example, if a customer only is interested in one product group or product, a new catalog is created with just the product group or product the customer is interested in. This obviously saves money by not printed unwanted materials for customers. Moreover, this is a more efficient use of resources such as paper and shipping. Second, the data in the catalog can be updated electronically which in turn can update the catalog without manually reformatting the catalog.

The present method and system provide a means for producing catalogs in multiple media from a single source of data. This is done without the need for a highly skilled graphic layout person for printed catalogs or a highly skilled computer programmer for electronic formats such as web pages or machine-readable storage. Once the user creates the catalog by selecting a catalog template and imports the data from the company database, which, in an embodiment, is performed without any knowledge of the company's database structure except its location, then the user can create a catalog in any of the formats discussed herein. It will be appreciated that the present invention is adaptable to produce catalogs in other formats that are not explicitly discussed herein.

The present method also provides a means for embedding specification sheets or material data safety sheets in the electronic catalog. While the specification sheets are quite often necessary to a sale, printing costs including the time to create the layout and physically printing the specification sheet generally prohibit inclusion of such sheets in a catalog. Additionally, if a catalog has numerous items, e.g., SKU's, then a catalog with specification sheets will quickly become cumbersome and too large for efficient use and dissemination. The electronic catalog according to the teachings of the present invention allows the specification sheets and/or material safety data sheets to be embedded in the catalog but not shown unless specifically requested by a user. Thus, customer having the catalog in electronic form or on a compact disk may find the product they are interested in, and display on a computer screen or print the sheet linked to that product.

The present method further provides a convenience to the business and its clients by enabling the business to print quotes from the catalog and enabling the client to print purchase orders. Quotes are printed in a manner similar to the method described herein for printing purchase orders.

The present method further provides automated data field creation by scanning a selected database and using the fields from that database as the fields in the records of the catalog database. The user can adopt all or only select a few of these fields as fields for the catalog. Thus, there is a direct link between fields in the existing databases and the fields in the catalog. The present method further automatically creates image files (e.g., PDF format), dynamic web pages and CD-ROMS of the catalog. Once the fields are created and the data is imported, then the present method produces a professional-appearing catalog, which is ready for distribution.

The present method further creates a dynamic catalog that can be updated with new or revised data from the existing databases without manually reentering the information into the catalog and manually reformatting the catalog. The present method allows fields to be removed from an exported version of the catalog. For example, the version of the catalog internal to the company may include a unit cost field. The unit cost field is removed before a sub-catalog is produced for a customer.

The present method further automatically creates a table of contents and index as it builds the catalog. Thus, when the catalog is saved in electronic form or printed it has a table of contents and index. The catalog according to the present invention being dynamic also lends itself to updating the table of contents and index, when sub-catalogs are produced a new table of contents and index are created for the sub-catalog. It further updates the table of contents and index whenever a product is removed from the catalog. Moreover, the dynamic nature of the catalog allows the customer to search multiple fields to achieve more targeted search results.

These are not exclusive of other benefits and improvements over conventional catalog production methods and systems. One skilled in the art will recognize additional benefits of the present method and system.

It will be understood that the present invention may be embodied in a sequence of instructions stored on a portable medium or transmitted through an electrical network, e.g., computer network and Internet, executable on a general purpose computer, and is not limited to the specific computer system discussed herein.

What is claimed is:

1. A method for dynamically generating a prescribed catalog, using a computer system which summarizes selected offerings of a user, the method comprising:
    obtaining general information via the computer system related to the user generating a prescribed catalog and storing such information in a catalog database;
    establishing information fields for inclusion into the catalog database, wherein the company database includes a plurality of data fields which are made available through the computer system for inclusion as information fields within the catalog database and which correspond to the company's offerings, and wherein establishment of the information fields is achieved by selecting at least one of these company database data fields via a user input device, and wherein additional information fields can also be manually established by the user via the user input device;
    selecting via the user input device information fields within the catalog database to be included in the prescribed catalog and selecting via the user input device catalog design attributes for the prescribed catalog, wherein the selected information fields include product attributes for inclusion in the prescribed catalog;
    the computer system creating the catalog database using information in the company database correlated to established information fields and information generated manually by the user, wherein any information in the company database correlated to established information fields is entered into the catalog database by downloading information from those selected information fields that are also found in the company database, and wherein any information fields manually generated is created by manually entering data via the user input device into those data fields;
    identifying a plurality of catalog templates via the user input device for use in the prescribed catalog, wherein each catalog template outlines the presentation format for the identified information fields within the catalog database; and
    the computer system producing the prescribed catalog in a selected format based upon the identified catalog templates and the catalog database, wherein the prescribed catalog includes the selected offerings and producing the prescribed catalog further comprises assembling at least one catalog page by dynamically fitting the selected information fields and product attributes into the identified catalog templates for the at least one catalog page thus producing an output format that follows the catalog template and which lists the selected information fields.

2. The method of claim 1 wherein the catalog database further includes product information and catalog category information, wherein the product information also exists in the company database and the catalog category information provides information necessary for producing the catalog.

3. The method of claim 1 wherein the produced catalog is a paper catalog comprising the assembled catalog pages which are then printed.

4. The method of claim 1 wherein the catalog comprises the assembled catalog pages electronically stored in an electronic page format.

5. The method of claim 4 where the electronic page format is stored in a file format readable by a third party software package.

6. The method of claim 4 wherein the electronic page format is selected from the group comprising PDF format, indd format, qxd format, qxp format, rtf format, tiff format, jpeg format, doc format, xls format and txt format.

7. The method of claim 1 wherein the design attributes include the designation of product pictures and their related storage location.

8. The method of claim 7 wherein the design attributes further include picture size and orientation.

9. The method of claim 1 wherein the created catalog database will include product information and catalog designation information.

10. The method of claim 1 wherein the step of producing the prescribed catalog comprises arranging information in the prescribed template so that only data having non-null values is listed.

11. The method of claim 10 wherein the identified template is selected from the group of: single-column with no figure; dual column with no figure; three column with no figure; four column with no figure; single column with figure right, single column with figure left; single column with figure above; single column with figure below; dual column with figure right, dual column with figure left; dual column with figure above; dual column with figure below; three column with figure right, three column with figure left; three column with figure above; three column with figure below; four column with figure right, four column with figure left; four column with figure above; and four column with figure below.

12. The method of claim 1 wherein the catalog database is arranged in a user selectable hierarchy, thus allowing the catalog to be created based upon a plurality of categories that exist within the hierarchy and to be ordered based upon the user selected hierarchy.

13. The method of claim 1 wherein the template sets forth a header for each page, a footer for each page and a tab for each page, wherein the header, footer and tab comprise information contained in the catalog database.

14. The method of claim 13 wherein producing the catalog further comprises reading the product attributes and the catalog design attributes from the catalog database, and building an attribute table on the page by dynamically calculating the space available for the attributes after the header, footer and tab for each page, and dynamically calculating the necessary spacing for the designated attributes.

15. The method of claim 14 wherein the product attributes include alphanumeric data and image data, and wherein the calculation of spacing maintains the alphanumeric data and image data so they are displayed together.

16. The method of claim 1 wherein the computer system comprises a network server and at least one client device, and wherein the user input device is coupled to the client device.

17. The method of claim 1 wherein the computer system is a stand alone computer.

18. The method of claim 1 wherein the computer system comprises a client device and a web accessible server.

19. A method for creating a printed page based product catalog using a computer system, wherein the product catalog is created utilizing product information contained within a company database, comprising:
- through the computer system, identifying the product catalog to be generated and storing a catalog name;
- through the computer system, scanning the company database to identify existing company database field names corresponding to existing data within the company database which is thus available for inclusion in the product catalog;
- selecting from the existing data within the company database via a user input device, the product data desired to be included in the product catalog and through the computer system storing the corresponding database field names in a catalog database;
- creating a plurality of data presentation formats desired to be utilized within the desired product catalog via the computer system, wherein the data presentation format includes a listing of the catalog data that will be presented in the product catalog and at least one information presentation template selected via the user input device, the template setting forth the general page layout of information in the product catalog;
- through the computer system, building the catalog database using the stored catalog information fields names, wherein data in the catalog database is generated by first generating a link between the catalog database and the company database, and wherein the catalog database is then populated based upon the generated link between the catalog database and the company database,
- through the computer system assembling the product catalog using the catalog database and the created data presentation formats, wherein the catalog data is collected from the catalog database and appropriately arranged to fit the presentation formats depending upon the catalog data itself; and
- the computer system outputting the product catalog in printed page format.

20. The method of claim 19 wherein generating the product catalog involves the use of less than all of the data fields existing in the catalog database.

21. The method of claim 19 wherein the links between the company database and the catalog database causes any updates to information contained in the company database to be similarly updated in the catalog database.

22. The method of claim 19 wherein outputting in a printed page format includes an output selected from the group of paper printing, faxing, and electronically storing page images.

23. The method of claim 19 wherein the template is selected from the group of: single-column with no figure; dual column with no figure; three column with no figure; four column with no figure; single column with figure right, single column with figure left; single column with figure above; single column with figure below; dual column with figure right, dual column with figure left; dual column with figure above; dual column with figure below; three column with figure right, three column with figure left; three column with figure above; and three column with figure below; four column with figure right, four column with figure left; four column with figure above; and four column with figure below.

24. The method of claim 19 wherein the step of generating the product catalog comprises arranging information in the prescribed template so that only data having non-null values is listed.

25. The method of claim 19 wherein the template sets forth a header for each page, a footer for each page and a tab for each page, wherein the header, footer and tab comprise information contained in the catalog database.

26. The method of claim 25, wherein the arrangement of data to fit a designated presentation format comprises dynamically calculating the space available for the designated data after the identification of the header, footer and tab, and dynamically calculating the appropriate spacing for the designated data to be included in the product catalog.

27. The method of claim 26 wherein the data identified to be included within the product catalog includes alphanumeric data and image data, and wherein the calculation of spacing maintains the alphanumeric data and image data so they are displayed together.

28. The method of claim 19 wherein the computer system comprises a network server and at least one client device, and wherein the user input device is coupled to the client device.

29. The method of claim 19 wherein the computer system is a stand alone computer.

30. The method of claim 19 wherein the computer system comprises a client device and a web accessible server.

31. A method for dynamically generating a prescribed catalog using a computer system which utilizes information contained within a company database while also being able to dynamically generate subsequent catalogs based upon the generated catalog, comprising:
- through the computer system creating a catalog database by storing general information related to a user generating the prescribed catalog and by establishing information fields for inclusion into the catalog database, wherein the company database includes a plurality of data fields which are made available for inclusion as information fields within the catalog database and establishment is achieved by selecting at least one of the company database data fields via a user input device, and wherein additional information fields can also be manually established by the user via the user input device;
- selecting information fields within the catalog database via the user input device which are to be included in the prescribed catalog and identifying selected catalog design attributes for the prescribed catalog, wherein the identified information fields include product attributes for inclusion in the prescribed catalog;

through the computer system, creating the catalog database using information in the company database correlated to selected information fields and information generated manually by the user via the user input device, wherein any information in the company database correlated to selected information fields is entered into the catalog database by downloading information from those selected information fields that are also found in the company database, and wherein any information fields manually generated are created via the user input device by manually entering data into those data fields;

through the computer system, identifying a plurality of catalog templates for use in the prescribed catalog, wherein each catalog template outlines the presentation format for the selected information fields and catalog design attributes within the catalog database, with the template further setting forth a header for each page, a footer for each page and a tab for each page, wherein the header, footer and tab comprise information contained in the catalog database; and the computer system assembling the prescribed catalog in a selected format based upon the identified catalog template and the created catalog database, wherein assembling the prescribed catalog comprises reading the product attributes and the catalog design attributes from the catalog database, dynamically fitting the selected data and product attributes into the identified catalog template by first building an attribute table on each page being assembled by dynamically calculating the space available for the product attributes after the header, footer and tab for each page, dynamically calculating the necessary spacing for the designated product attributes, and thereafter fitting the selected data and product attributes in the calculated spacing thus producing an output format that follows the template and which lists the selected information, wherein the product attributes include alphanumeric data and image data, and wherein the calculation of spacing maintains the alphanumeric data and image data so they are displayed together, and wherein only alphanumeric data having non-null values is listed.

32. The method of claim 31 wherein the identified template is selected from the group of: single-column with no figure; dual column with no figure; three column with no figure; four column with no figure; single column with figure right, single column with figure left; single column with figure above; single column with figure below; dual column with figure right, dual column with figure left; dual column with figure above; dual column with figure below; three column with figure right, three column with figure left; three column with figure above; three column with figure below; four column with figure right, four column with figure left; four column with figure above; and four column with figure below.

33. The method of claim 31 wherein the catalog design attributes include the designation of product pictures and their related storage location, size and orientation.

34. The method of claim 31 wherein the computer system comprises a network server and at least one client device, and wherein the user input device is coupled to the client device.

35. The method of claim 31 wherein the computer system is a stand alone computer.

36. The method of claim 31 wherein the computer system comprises a client device and a web accessible server.

* * * * *